US011884090B1

(12) United States Patent
Bedinghaus

(10) Patent No.: US 11,884,090 B1
(45) Date of Patent: Jan. 30, 2024

(54) PIVOTING POP UP ARTICLE AND METHOD

(71) Applicant: Sandy Alexander, Inc., Clifton, NJ (US)

(72) Inventor: William C. Bedinghaus, St. Petersburg, FL (US)

(73) Assignee: SANDY ALEXANDER, INC., Clifton, NJ (US)

( * ) Notice: Subject to any disclaimer, the term of this patent is extended or adjusted under 35 U.S.C. 154(b) by 22 days.

(21) Appl. No.: 17/867,301

(22) Filed: Jul. 18, 2022

Related U.S. Application Data

(60) Provisional application No. 63/223,196, filed on Jul. 19, 2021.

(51) Int. Cl.
*B42F 17/18* (2006.01)
*B42D 15/04* (2006.01)
*G09F 1/08* (2006.01)

(52) U.S. Cl.
CPC ............. *B42D 15/042* (2013.01); *G09F 1/08* (2013.01)

(58) Field of Classification Search
CPC ........ B42F 17/18; B42F 5/005; B65D 85/544; B65D 5/005; B65D 5/022; B65D 3/04; G11B 33/045
See application file for complete search history.

(56) References Cited

U.S. PATENT DOCUMENTS 864,984 A * 9/1907 Cueny ....................... G09F 5/04 24/DIG. 8
958,582 A 5/1910 Bodine
1,415,429 A 5/1922 Cueny
1,603,362 A 10/1926 Stewart
2,105,696 A * 1/1938 Lewis .................. B42F 17/346 84/486
2,253,858 A 8/1941 Lucas et al.
2,287,265 A * 6/1942 Oltmanns ............. B23D 63/10 76/35
2,595,972 A 5/1952 Naurison
3,008,248 A 11/1961 Steinthal
4,150,844 A * 4/1979 Yoshizawa ............. B42D 1/003 281/19.1
4,441,270 A 4/1984 Crowell et al.
4,706,396 A * 11/1987 Nomura .................... B42F 7/06 40/530
5,630,626 A * 5/1997 Harper .................... B42F 17/20 281/38
6,246,461 B1 6/2001 Hinsberg
9,415,624 B1 * 8/2016 Bedinghaus ............ B42F 17/18
(Continued)

*Primary Examiner* — Shin H Kim
(74) *Attorney, Agent, or Firm* — Frijouf, Rust & Pyle, P.A.

(57) ABSTRACT

A pivoting pop up article and method of making has a hinge fold positioned between a front cover and a rear cover. A displacement leaf includes a base, a leg and a tab. A base leaf couple secures the base of the displacement leaf to the front cover. The base is offset relative to the hinge fold for defining a base offset dimension between the hinge fold and the base. A first interior couple secures an interior leaf to the rear cover. A second interior couple secures the interior leaf to the rear cover. The first interior couple and the second interior couple define a channel between the rear cover and the interior leaf. The base offset dimension causes the displacement leaf to be pivoted within the channel during pivoting the front cover between a closed position and an open position for extending the tab above the rear cover.

23 Claims, 20 Drawing Sheets

(56) References Cited

U.S. PATENT DOCUMENTS

| | | | | |
|---|---|---|---|---|
| 9,889,685 | B2 * | 2/2018 | Koop | B41J 15/042 |
| 11,014,396 | B1 * | 5/2021 | Buechel | B42C 1/00 |
| 2012/0112449 | A1 * | 5/2012 | Engel | B42C 3/00 101/483 |

* cited by examiner

PIVOTING POP UP ARTICLE AND METHOD

CROSS-REFERENCE TO RELATED APPLICATIONS

This application claims the benefit of U.S. Patent Provisional Application No. 63/223,196, filed Jul. 19, 2021, All subject matter set forth in Provisional Application No. 63/223,196 is hereby incorporated by reference into the present application as if fully set forth herein.

FIELD OF THE INVENTION

This invention relates to printed matter and more particularly to the improved pivoting pop up article and method of making.

BACKGROUND OF THE INVENTION

The history of printing started with the duplication of images around 3000 BC. It evolved from the use of round cylinder seals to impress clay tablets in Mesopotamia. Block printing on cloth preceded printing on paper, which became common by the mid 1400's. The origin of moveable type is credited to the Chinese around 1040, with metal moveable type appearing around 1230. These systems were not widely used due to the extensive set of characters. In 1439 the development of moveable type printing technology firmly established modern moveable type printing. Lithographic printing appeared in the late 1700's. Color printing, offset printing, screen printing, and flexography were further developments in the printing art. In the 1960's and 1970's, photocopiers, thermal, dot matrix, inkjet, and laser printers were introduced. The quality and desired appearance of the printed product is controlled by many criteria. A several considerations include printing press to be used and substrate type. Substrate determinations must consider the weight, density, opacity, paper grain, coating, moisture content, porosity and ink absorbency.

Coincident with the evolution and development of printing technology, graphic design developments and improvements also progressed. Binding and finishing developments enhanced the appearance of the final printed product. The processes of cutting, collating, folding, and mechanical, chemical and thermal fastening enable the graphic designer to produce a wide variety of printed products. Many styles and designs of multi-page graphic design pieces have appeared. The uniqueness of prim media styles provides an attraction to the viewer. This is especially true of advertising media, where each significant difference from the media produced by the advertiser's competition, provides an advertising advantage. Examples of these improvements include a brochure or card wherein upon opening the card, an interior portion of a card moves relative to the base card, A three dimensional variation of the movement effect includes so called "pop ups" whereby upon opening a folded card or brochure, a three dimensional pylon rises from the surface of the card. These effects are achieved through proper cutting folding and mounting and binding of the moveable piece or pylon on the interior surfaces of the card or brochure, Although these effects are well known to those skilled in the art, there still exists the challenge to produce print media pieces having unique motions or effects in order to achieve a competitive advantages over other print pieces.

There have been many in the prior art who have attempted to solve these problems with varying deuces of success. None, however completely satisfies the requirements for a complete solution to the aforestated problem. The following U. S, Patents are attempts of the prior art to solve this problem.

U.S. Pat. No. 864,894 to McPhee discloses a magazine card folder comprising a case of having a suitable back and cover joined together and a plurality of leaves formed of a length of suitable material arranged in folds. The folds form two sets of sections of different lengths and alternatively occur in the same length. The adjoining sections have their inner surfaces joined together to form leaves. The inner leaf is mounted on the back. Means engage the uppermost section and displaying the pages of the various leaves in turn, as and for the purpose specified.

U.S. Pat. No. 958,582 to Bodine discloses a signature for combination fashion and simple books comprising two or more pairs of stiff sheets joined together by binding tape to provide stitching and binding means, One or more flexible fashion sheet interleaves are interposed between each two pairs of thick sheets. Stitching threads extend through the stitching and binding tapes of the thick sheets and interposed flexible sheets.

U.S. Pat. No. 1,415,429 to Ceuny discloses a display album having in combination a plurality of leaves, a pair of covers comprising, rectangular frames hinged together and having panels fitted therein to provide recesses at both the inner and outer sides of the covers. The construction being such that the inner recesses will receive the leaves and the inner faces of the frames will abut each other when the album is closed so that the edges of the leaves will then be entirely enclosed within the frames. An expandable binder secures the leaves to the covers. A thickened pedestal centrally located beneath the lower side of each frame firmly supports the album in upright position whether the same is opened or closed. A clasp positively secures the covers in close position.

U.S. Pat. No. 1,603,362 to Erskine discloses a receptacle display means comprising a series of foldable and expansible paper receptacles of varying size arranged one upon the other in face-to-face relation with the mouth portions of the receptacles contained in the sane plane to facilitate individual expansion of the receptacles. The contacting sides of the receptacles are united for mutual support and to enable all of the receptacles to be expanded and collapsed in unison.

U.S. Pat. No. 2,105,696 to Lewis discloses an apparatus comprising a base, a swinging leaf having a free edge and an opposite heel edge, a swinging anchoring member hingedly connecting a base with the leaf at a point on the latter between the edges and adjacent to the heel edge and means connected with the heel edge of the leaf for swinging the latter.

U.S. Pat. No. 2,253,858 to Lucas et al. discloses an automatic page turning block comprising a plurality of stiff sheets of like sides stacked in staggered formation, the rear margin of each but the top sheet protruding to the back f nom under the overlying sheet. A pocket has a bottom, rear and top wall. The top wall extends short of the back edge of the top sheet of the plurality of sheets. When the plurality of sheets are inserted in the stacked staggered formation into the pocket and the rear edge of the bottom sheet of the plurality of sheets substantially abuts against the rear wall. A flexible tape extends over and is attached upon the protruding rear margins of the sheets and upon a corresponding rear margin of the top one of the plurality of stiff sheets and folded back from the rear margin of the top sheet onto and attached upon the top wall so that the sheets will be successively, swung up when the stacked plurality of sheets are pulled out from the pocket. A guide means extends from the bottom wall and confines the bottom one of the plurality of sheets bottomwise and transversely went the plurality of sheets are pulled out from the pocket.

U.S. Pat. No. 2,595,972 to Naurison discloses a device including a pair of substantially coextensive members fixed in relation to each other, A slide is movable between the members. A strip extends between and is secured to the slide and a selected one of the members and a plurality of leaves. The leaves when the slide is positioned substantially wholly between the members are superimposed one upon the other and then positioned between the slide and the selected number. The leaves when the slide is moved out from a positioned substantially wholly between the members is rotated in spaced radial relationship to a positioned substantially on top of the selected member.

U.S. Pat. No. 3,008,248 to Steinthal discloses a sample swatch display book comprising front and back covers to form retaining material. An accordion pleated sheet of flexible material extending between and secured at opposite ends to the front and hack covers respectively. The sheet contains a phi; of hinge folds form expandable traverse pleats. Each pleat has an inside hinge fold and a pair of leaves extending from the hinge fold towards respective outside hinge folds integrally connected the pleat to adjacent flanking pleats. One leaf of each pleat is nearer to the front cover than the other leaf of the pleat in close position of the book. Reinforcing strips of rigid material are secured to and line the leaves respectively of the pleats to impart form retaining rigidity to the leaves between hinge folds. A plurality of sample backing sheets different sample swatch is secured flat to each of the backing sheets. The backing sheets are large enough to support substantially the entire area of the swatches. The covers are large enough to cover substantially the entire area of the backing sheets in the closed position of the book. Snap fasteners means are near one end of each backing sheet. Snap fastener means are secured to each of those reinforcing strips which are secured to the nearer leaves of the pleats and constitute mates to the snap fastener means on the corresponding backing sheet. Each backing sheet has its snap fastener means releasably engaging the snap fastener means on the corresponding reinforcing strip with the backing sheet flat against the reinforcing strip and with the sample swatch disposed on the side of the backing sheet facing towards the front cover in close position of the book. The leaves in between the nearer leaves are free from attachments to swatch backing sheets and the fastener means on each backing sheet and on the corresponding reinforcing strip being protectively sandwiched in close position of the book between a pair of the in between strip reinforcing leaves located on opposite sides of and adjacent to the leaf supporting the latter backing sheet and the latter reinforcing strip.

U.S. Pat. No. 4,441,270 to Crowell, et al, discloses a multi-page folder having a staggered array of interleaved pages successively flipped by manual actuation of a drawstrip. The folder includes a back cover panel bounded by a right fold line joining it to an overlying contiguous base panel. A central slot formed near the fold line joins the back panel and the base panel. A distal segmented tab extends from the base panel away from the right fold line. A plurality of substantially parallel told lines traverses and subdivides the tab into plural segments. An elongated drawstrip joins the last tab segment most remote from the right fold line and extends between the back cover panel and the base panel through the central slot. Longitudinally movable from a retracted position substantially flattening the segmented tab to an extended position protruding through the central slot beyond the right fold line and curling the segmented tab under the base panel toward the slot. The individual separate pages are respectively secured to individual segments of the segmented tab and interleaved in staggered array protruding alternately toward opposite sides of the elongated drawstrip and the segmented tab, whereby progressive movement of the drawstrip from its retracted position towards its extended position causes progressive curling movement of the segmented tab, successively flipping over the individual staggered interleaved pages, while at all times displaying to view at least one full page and a substantial area of an underlying staggered page, thereby changing only part of the indicia displayed during each successive stage of the page-flipping operation.

U.S. Pat. No. 4,809,453 to Morgan discloses a invention relating to a folding card that displays one picture when closed and another picture when opened, comprising three hinged panels which form a front cover, a rear cover and an inside panel. Positioned partially in upper and lower channels formed by flanges hinged to the inside cover are a stationary picture unit and a movable picture unit. The picture units are each made of two subunits formed with slots and strips which are fitted together with the strips partially overlapping. The two picture units are mated together, and an extension of the moving picture unit is attached to the front cover. When the assembled picture card is in a closed position, the strips of the movable unit are displayed; when opened, the extension pulls the movable picture unit to the left causing its strips to smoothly slide behind the now displayed strips of the stationary unit as a result of the overlapping construction.

U.S. Pat. No. 6,246,461 to Hinsberg discloses an image positioning device including surface elements having front and back sides and images on the front and/or the back sides. An end of a first surface element and a front side of a second surface element are numbly coupled along a first axis of rotation and an end of the second surface element and a front side of a third surface element are turnably coupled along a second axis of rotation. The first and second rotational axes are approximately parallel with one another, Successive flipping of the surface elements animates the images.

United States Patent Application 2011/0047839 to Ross, et al. discloses a method for manufacturing a pop-up article from one or more continuous webs of material using an inline printing press. The article comprises a curved or generally semi-cylindrical pop-up device enclosed within a base piece, such that when the base piece is in a closed position, the pop-up device lies flat therein, but when the base piece is moved to an open position, the pop-up device is forced outwardly from the base piece to form a curved or generally semi-cylindrical shape. The method comprises processing a first web or ribbon to define a base piece having a front and back cover, processing to second web or ribbon to define a pop-up device, separating the pop-up device from the second web or ribbon, adhering a tab of the pop-up device to the front cover, adhering a front flap of the pop-up device to the rear cover, and separating the article from the first web or ribbon.

Although the aforementioned prior art have contributed to the development of the art of binding printed materials, none of these prior art patents have solved the needs of this art.

Therefore, it is an object of the present invention to provide an improved pop up article.

Another object of this invention is to provide an improved pop up article that may be removed.

Another object of this invention is to provide an improved method for displacing a pop up article from a storage position to a deployed position.

Another object of this invention is to provide an improved method for producing a pop up article.

Another object of this invention is to provide an improved method that is cost effective to produce.

The foregoing has outlined some of the more pertinent objects of the present invention. These objects should be construed as being merely illustrative of some of the more prominent features and applications of the invention. Many other beneficial results can be obtained b modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying dewings.

SUMMARY OF THE INVENTION

The present invention is defined by the appended claims with specific embodiments being shown in the attached drawings. For the purpose of summarizing the invention, the invention relates to an improved printed matter construction and method of making including a pivoting pop up article. The pivoting pop up article comprises an exterior cover having a hinge fold positioned between a front cover and a rear cover for pivoting the front cover between a closed position and an open position. The front cover has an obverse side and a reverse side. The rear cover has an obverse side and a reverse side. A displacement leaf includes a base, a leg and a tab. A base leaf couple secures the base of the displacement leaf to the reverse side of the front cover. The base is offset relative to the hinge fold for defining a base offset dimension between the hinge fold and the base. An interior leaf has an obverse side, a reverse side, an inner edge and an outer edge. A first interior couple secures the reverse side of the interior leaf to the obverse side of the rear cover. A second interior couple secures the reverse side of the interior leaf to the obverse side of the rear cover. The first interior couple and the second interior couple define a channel between the rear cover and the interior leaf. The base offset dimension causes the displacement leaf to be pivoted within the channel during pivoting the front cover between the closed position and the open position for extending the tab above the rear cover.

In a more specific embodiment of the invention, a displacement leaf perforation is between the base and the leg for facilitating the displacement leaf to be pivoted within the channel during pivoting the front cover between the closed position and the open position.

In one embodiment of the invention, a frangible interior couple secures the obverse side of the interior leaf with the reverse side of the front cover. The frangible interior couple is offset relative to the hinge fold for defining a frangible offset dimension between the hinge fold and the base. The frangible interior couple and the frangible offset dimension cause bending of the displacement leaf at the displacement leaf perforation before the displacement leaf begins pivoted within the channel.

In another embodiment of the invention, interior leaf includes a leaf notch for positioning a portion of the leg and the tab between the interior leaf and the rear cover. The leaf notch includes a primary notch edge and a secondary notch edge. The primary notch edge engages with the leg and causes bending of the displacement leaf before the displacement leaf begins pivoted within the channel. The secondary notch edge permits the leg to pivot within the channel and extend the tab above the rear cover.

The invention is also incorporated into the method of manufacturing a pivoting pop up article from a continuous ribbon of material using a line printing press. The method comprising the steps of inputting the continuous ribbon into the fine printing press. Images are imprinted on the continuous ribbon. A separation split is cut into the continuous ribbon to define a first ribbon having a front cover (A), a rear cover (B) and an interior leaf (C) and a second ribbon having a second interior leaf (D) and a displacement leaf (E). A first perforation is perforated into the second ribbon on the second interior leaf (D) A leaf notch is cut in the interior leaf (C). A base, a leg and a tab is cut from the displacement leaf (E). A second perforation is perforated between the base and the leg in the displacement leaf (F). Adhesive is applied for coupling a portion of the second interior leaf (D) to the front cover (A). Adhesive is applied for coupling a portion of the interior leaf (C) to the rear cover (B). The interior leaf (C) is folded onto the rear cover (B) for positioning a portion of the leg and the tab between the rear cover (B) and the interior leaf (C). A frangible adhesive is applied for coupling a portion of the interior leaf (C) to the second interior leaf (D). An adhesive is applied for coupling the base of the displacement leaf to the second interior leaf (D). The rear cover (B) is folded onto the front cover (A). The rear cover (B) and the front cover (A) are cut for creating multiple pivoting pop tip articles.

The foregoing has outlined rather broadly the more pertinent and important features of the present invention in order that the detailed description that follows ma be better understood so that the present contribution to the art can be more fully appreciated. Additional features of the invention will be described hereinafter which form the subject of the claims of the invention it should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DISCUSSION

FIGS. 1-17 illustrate a pivoting pop up article 10. The pivoting pop up article 10 may be referred to as a book 12 providing various purposes, including but not limited to, advertising, fiction material, nonfiction material, artwork or other written materials. The pivoting pop up article 10 is preferably constructed from a cellulose pulp material, however the construction may further include polymeric or other thin material that may receive writing, printing, or drawing.

Figure 1:
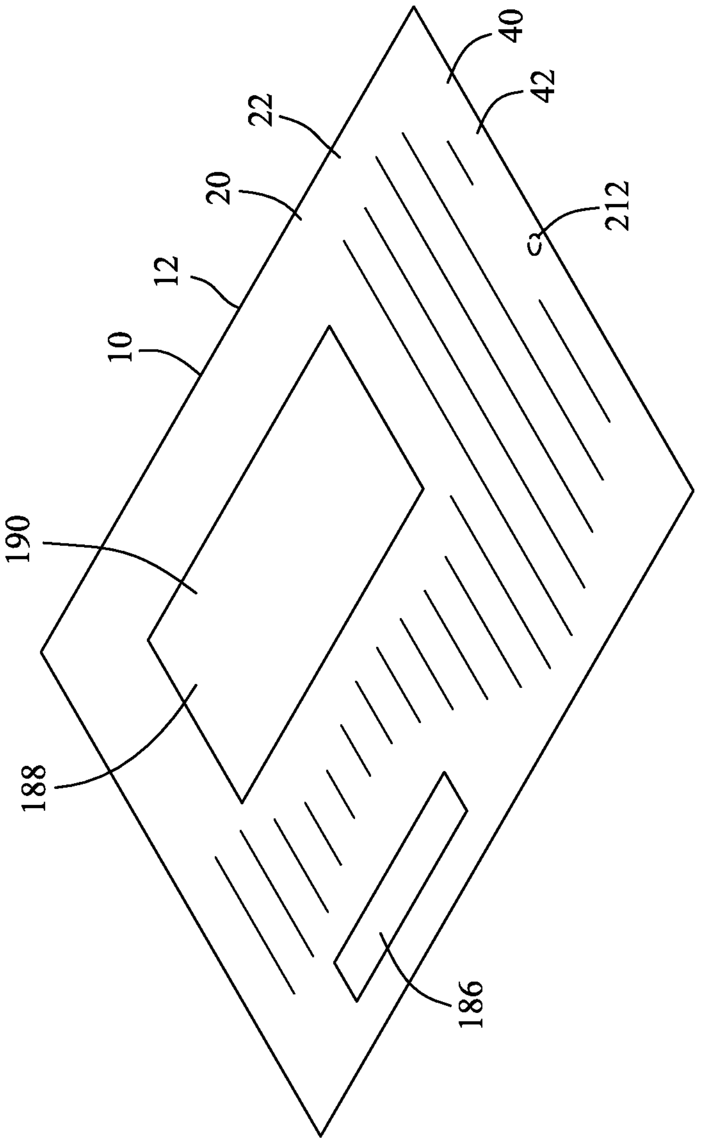
FIG. 1 is an isometric view of a pivoting pop up article of the present invention in a closed position.
Figure 2:
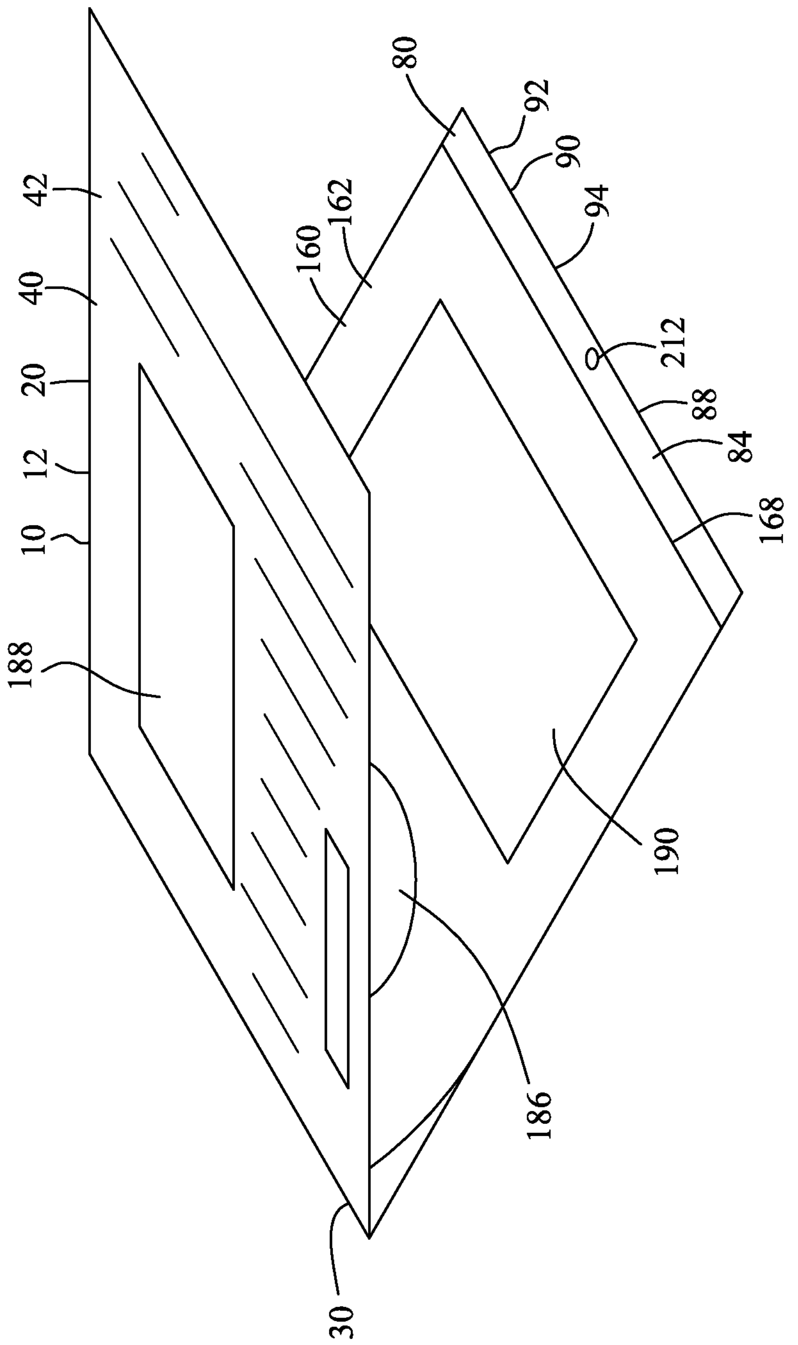
FIG. 2 is a view similar to FIG. 1 illustrating the pivoting pop up article in a first partial open position.
Figure 3:
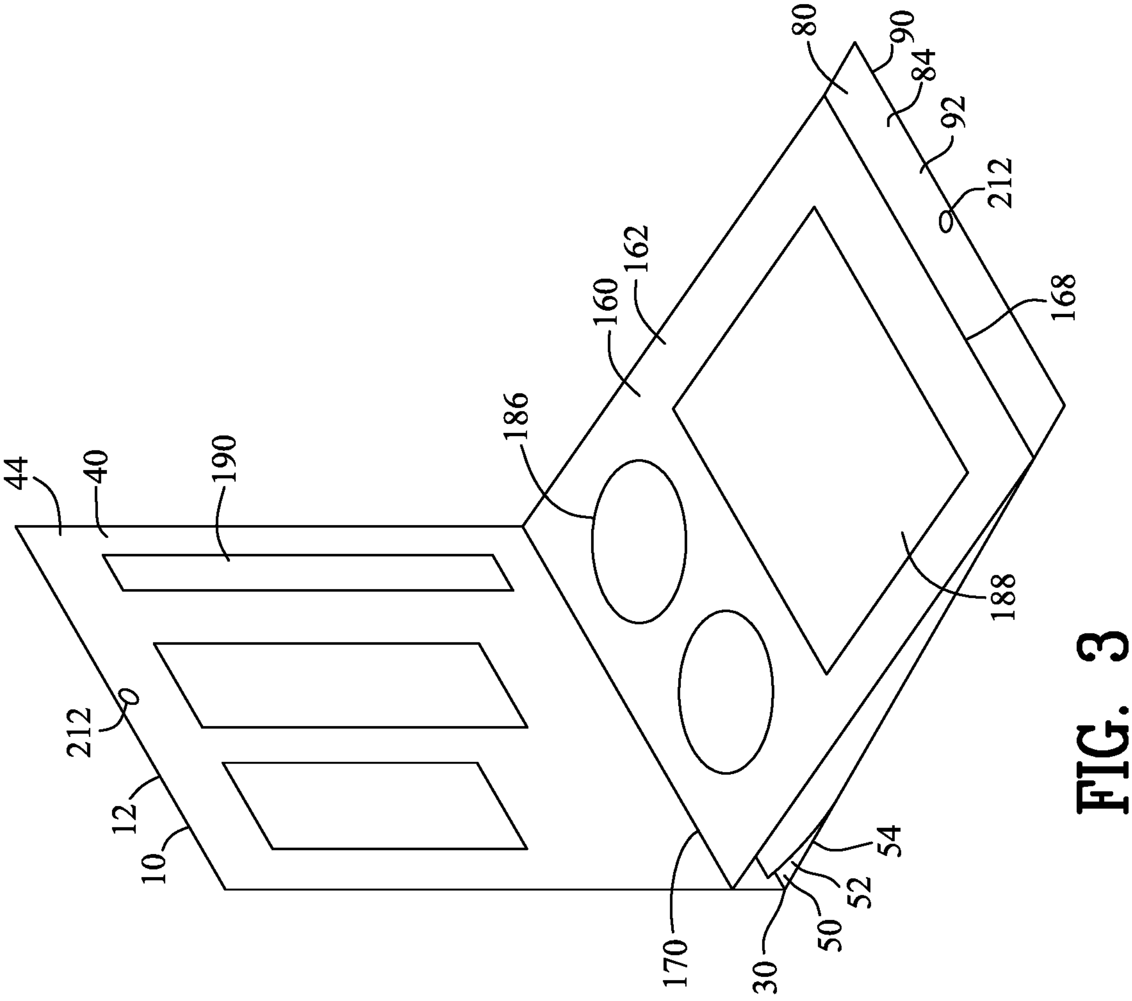
FIG. 3 is a view similar to FIG. 2 illustrating the pivoting pop up article in a second partial open position.
Figure 3A:
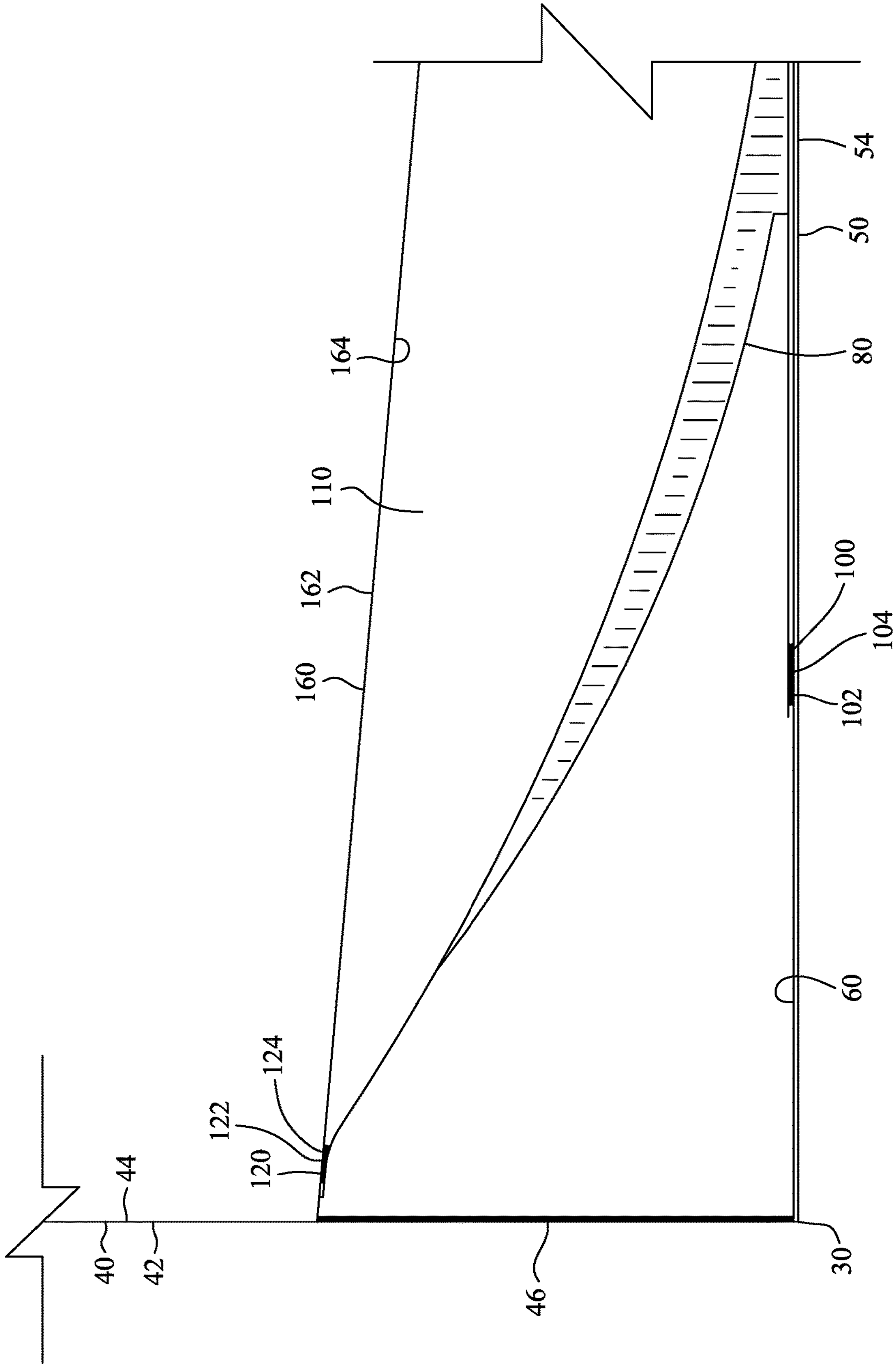
FIG. 3A is an enlarged front view of a portion of HG.
Figure 4:
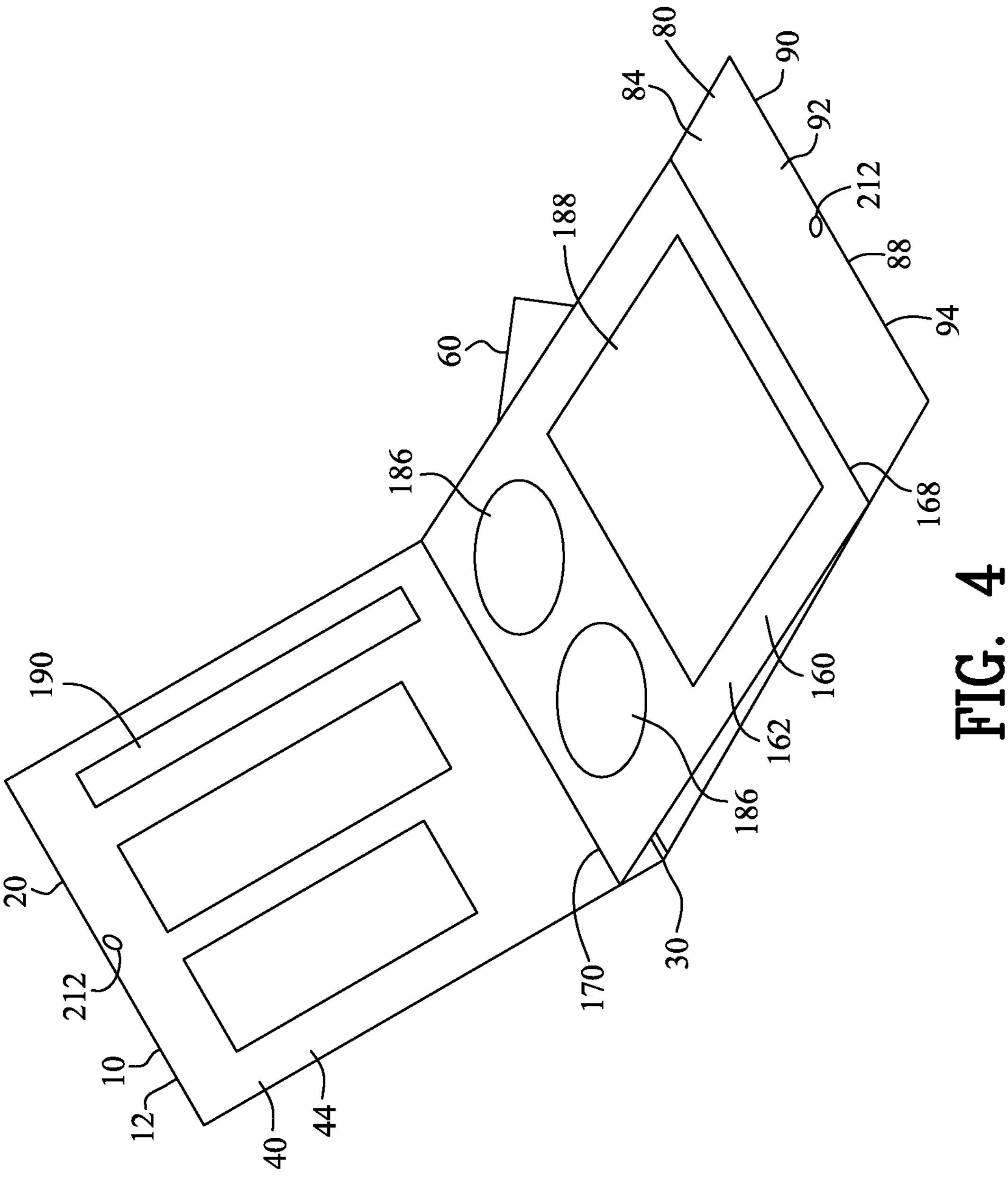
FIG. 4 is a view similar to FIG. 3 illustrating the pivoting pop up article in a third partial open position.
Figure 4A:
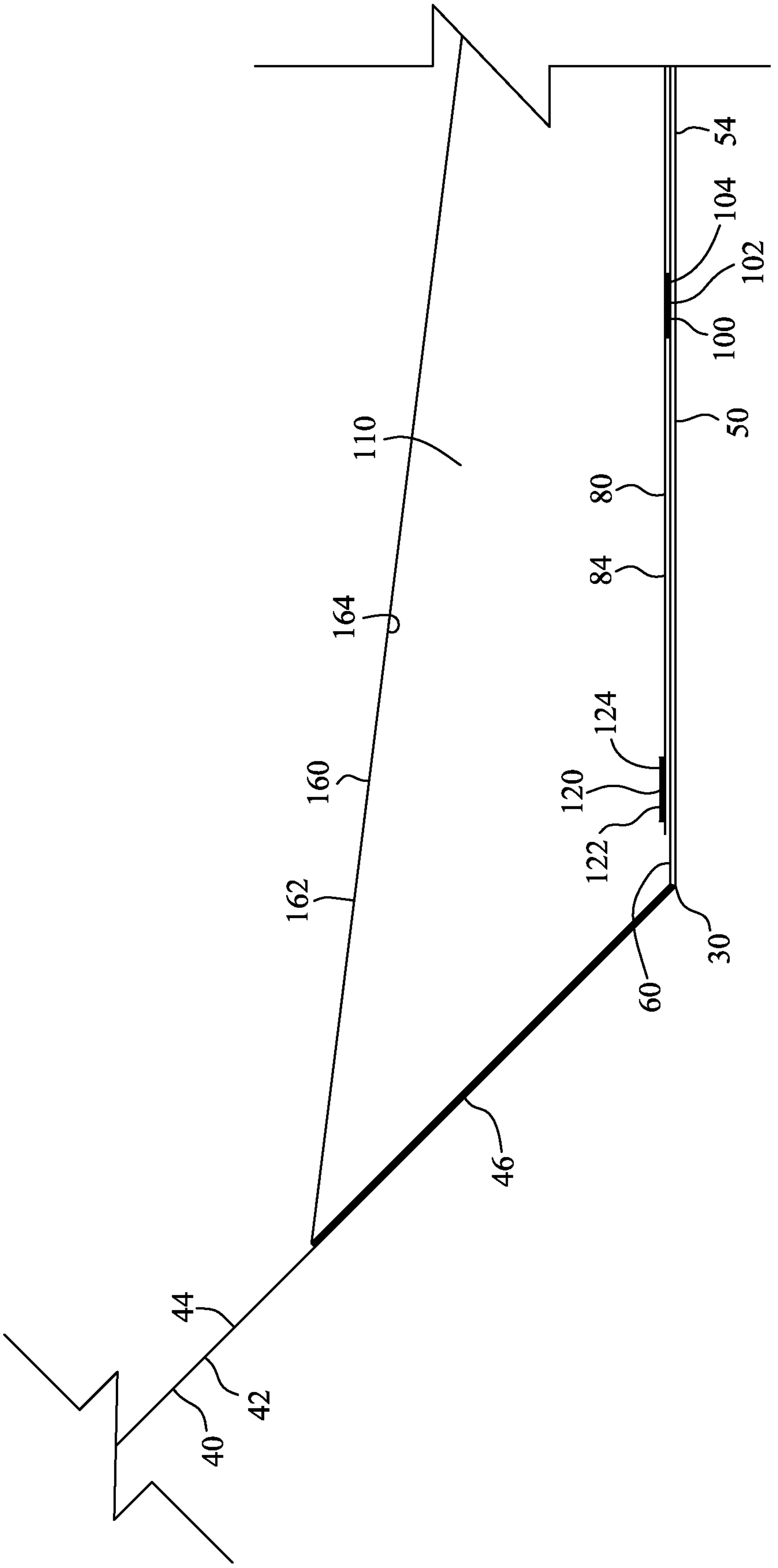
FIG. 4A is an enlarged front view of a portion of FIG. 4.
Figure 4B:
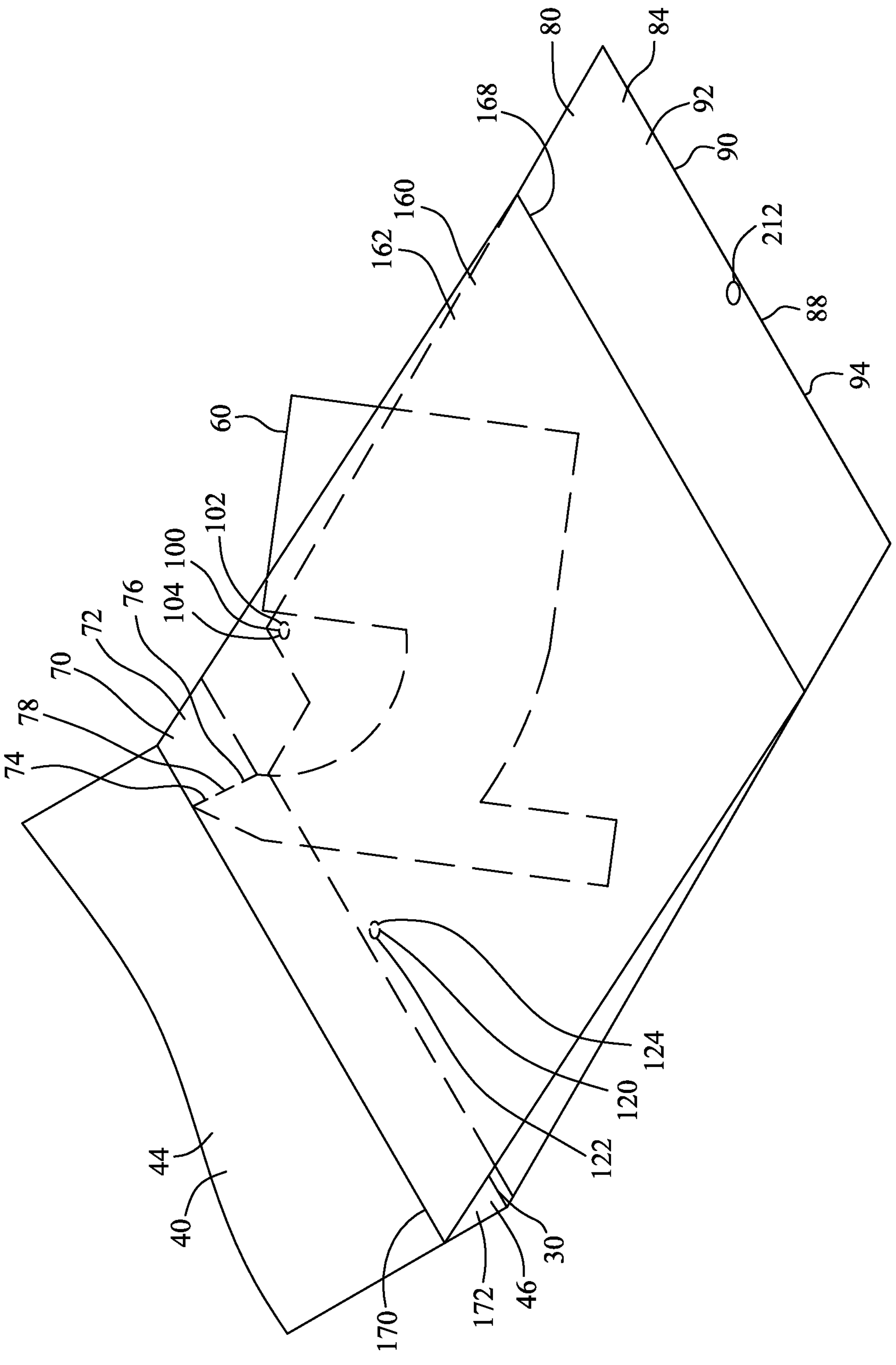
FIG. 4B is a view similar to FIG. 4 illustrating a displacement leaf and an interior leaf in dashed line.
Figure 5:
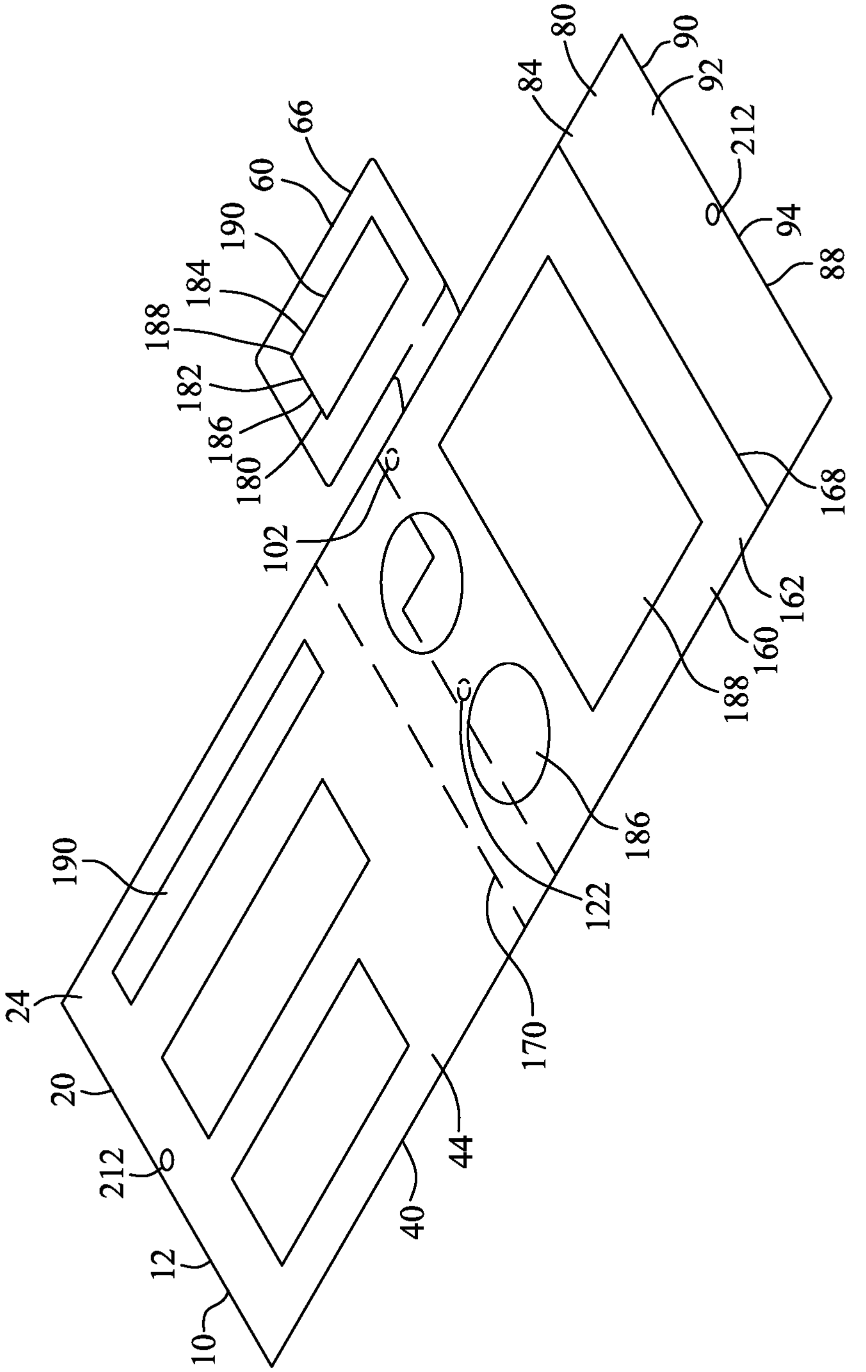
FIG. 5 is a view similar to FIG. 4 illustrating the pivoting pop up article in an open position.
Figure 6:
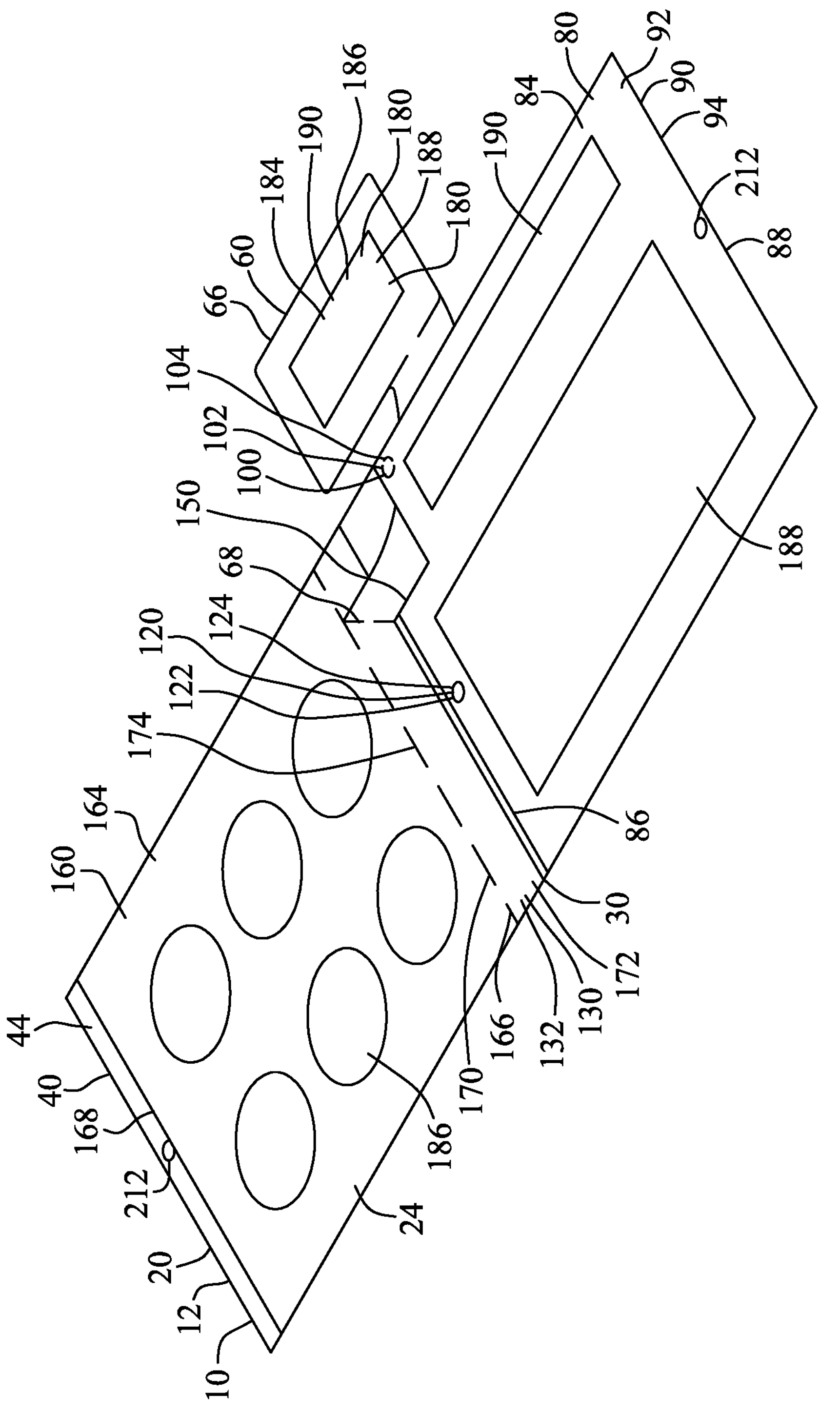
FIG. 6 is a view similar to FIG. 5 illustrating a second interior leaf positioned adjacent to a front cover.
Figure 7:
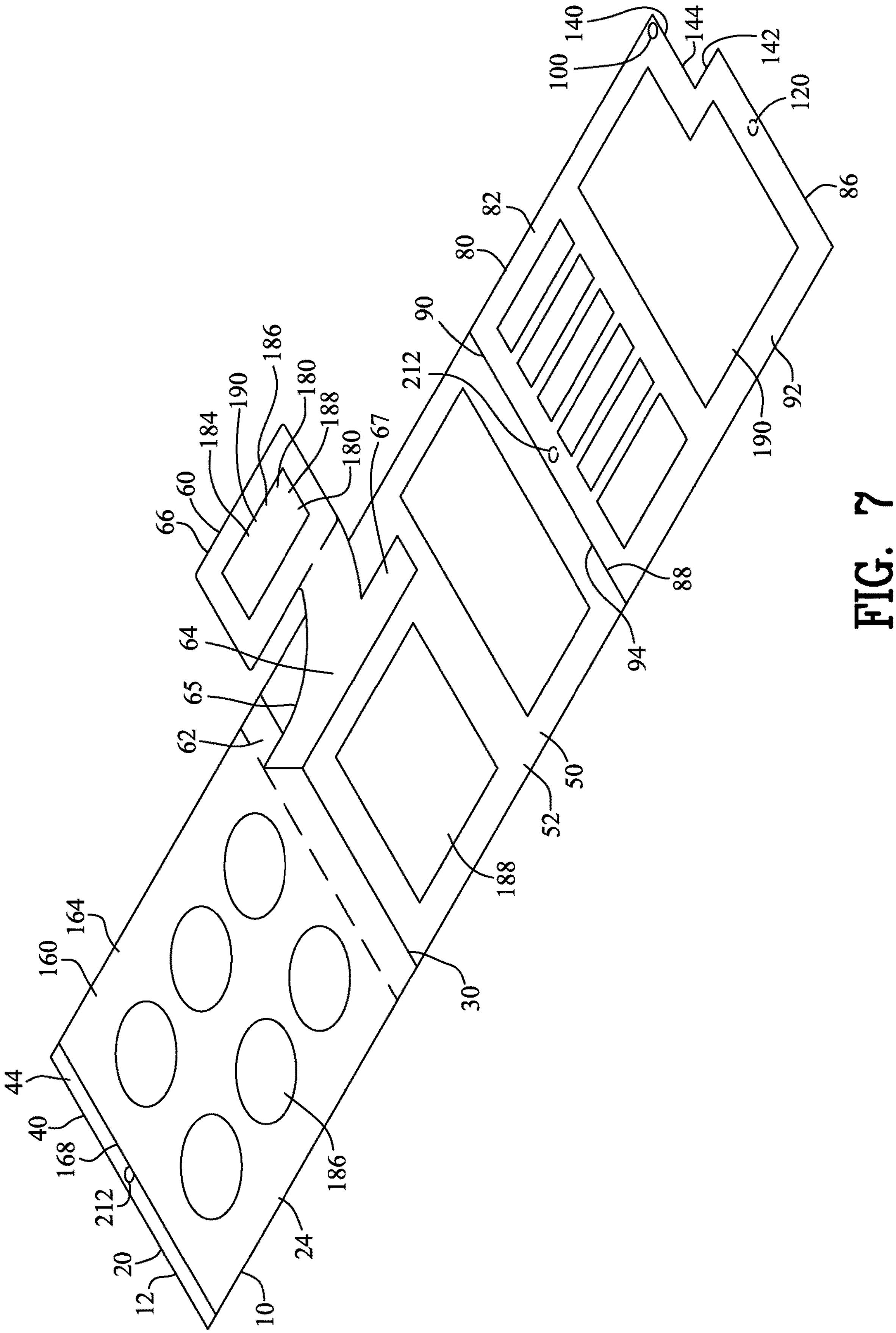
FIG. 7 is a view similar to FIG. 6 illustrating the interior leaf pivoted away from a rear cover.
Figure 8:
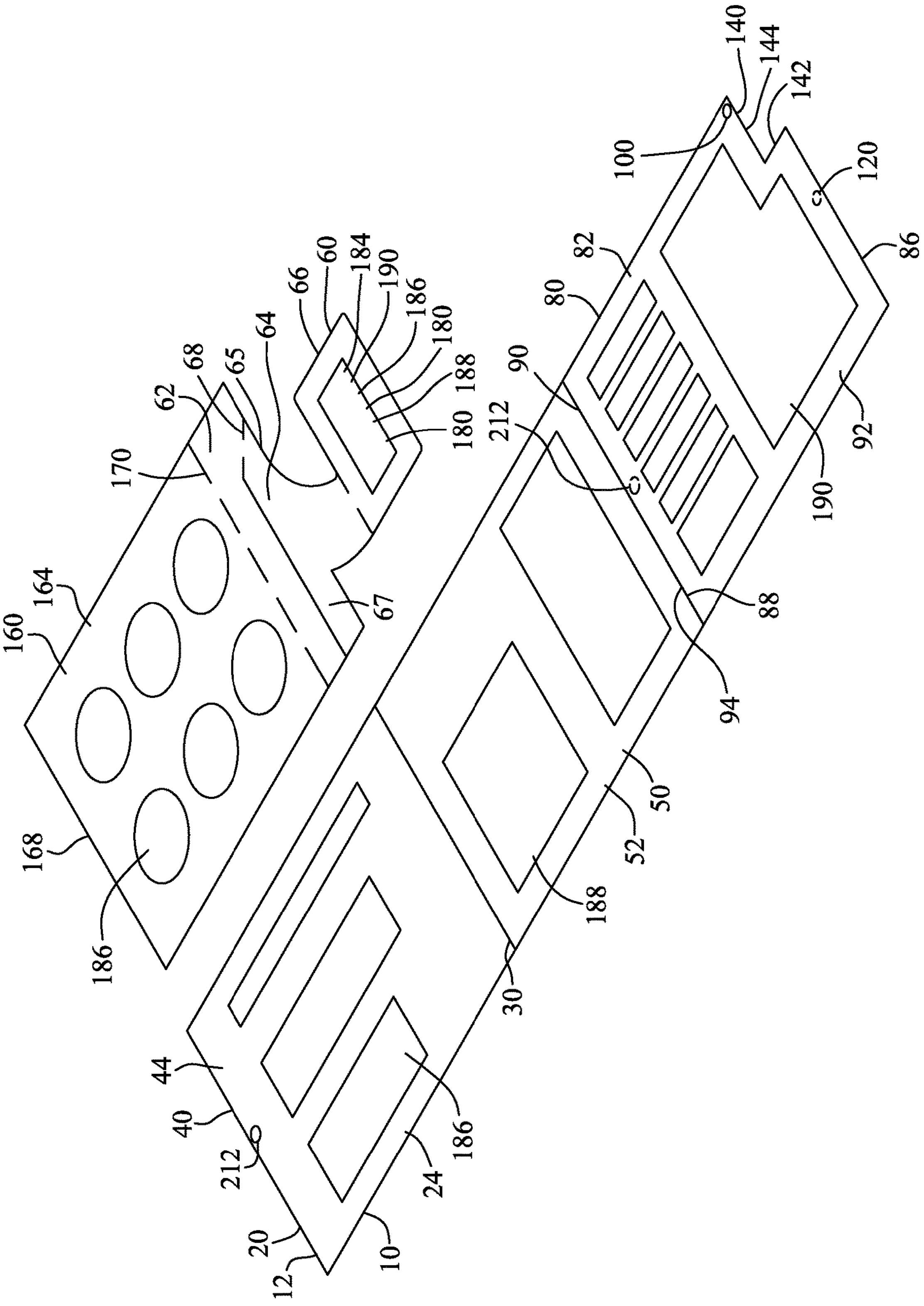
FIG. 8 is a view similar to FIG. 7 illustrating the second interior leaf and the displacement leaf removed from the front, rear and the interior leaf.
Figure 9:
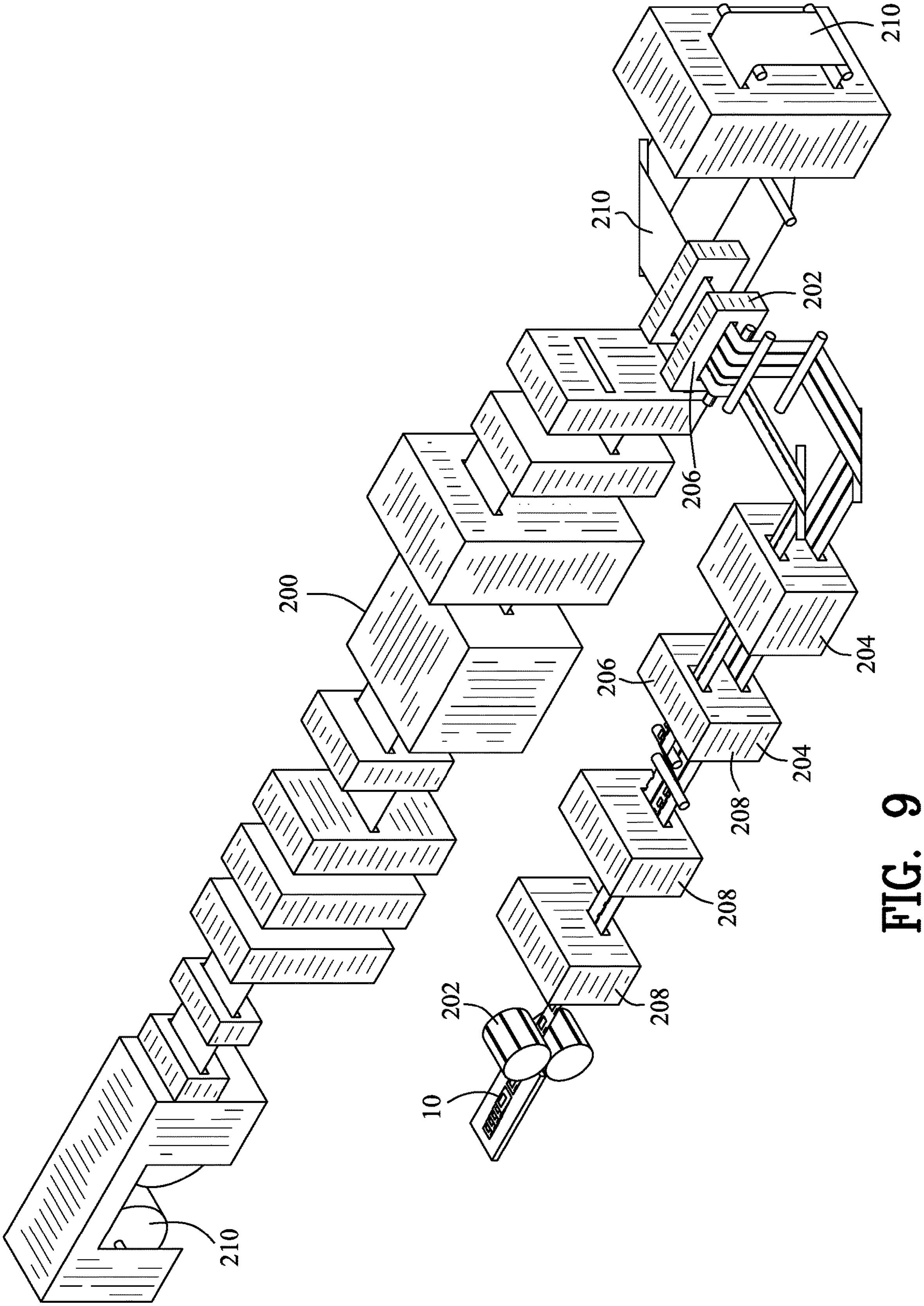
FIG. 9 is an isometric view of a line printing press for manufacturing the pivoting pop up article front a continuous ribbon of material.

The pivoting pop up article 10 comprises an exterior cover 20 having a hinge fold. 30 positioned between a front cover 40 and a rear cover 50 for pivoting the front cover 40 between a closed position 22 as shown in FIG. 1 and an open positions 24 as shown in FIG. 5. The front cover has an obverse side 42 and a reverse side 44. The rear cover 50 has an obverse side 52 and a reverse side 54.

A displacement leaf 60 includes a base 62, a leg 64 and a tab 66. A base leaf couple secures the base 62 of the displacement leaf 60 to the reverse side 44 of the front cover 40. The base leaf couple 70 may include adhesive. The base 62 is offset relative to the hinge fold 30 for defining a base offset dimension 72 between the hinge fold 30 and the base 62.

An interior leaf 80 has an obverse side 82, a reverse side 84, an inner edge 86 and an outer edge 88. A first interior couple 90 secures the reverse side 84 of the interior leaf 80 to the obverse side 52 of the rear cover 50, The interior leaf 80 may include an interior cover 92. The first interior couple 90 may include a second hinge fold 94 positioned between the rear cover 50 and the interior cover 90. More specifically, the front cover 40, the rear cover 50 and the interior leaf 80 with the hinge fold 30 and the second hinge fold 94 may be formed from a single sheet or continuous ribbon 210. The first interior couple 90 and the second interior couple 100 maintain the rear cover 50 adjacent to the interior leaf 80.

A second interior couple 100 secures the reverse side 84 of the interior leaf 80 to the obverse side 52 of the rear cover 50. The second interior couple 100 may include adhesive 102. The first interior couple 90 and the second interior couple 100 define a channel 110 between the rear cover 50 and the interior leaf 80. More specifically, the combination of the rear cover 50, the interior leaf 80, the first interior couple 90 and the second interior couple 100 create the channel 110 wherein the displacement leaf 60 may be positioned and traverse. As shown in FIGS. 1-6, the base offset dimension 72 causes the displacement leaf 60 to be pivoted within the channel 110 during pivoting of the front cover 40 between the closed position 22 and the open position 24 for extending the tab 66 above the rear cover 50.

A displacement leaf perforation 74 may be positioned between the base 62 and the leg 64 for facilitating the displacement leaf 60 to be pivoted within the channel 110 during pivoting of the front cover 40 between the closed position 22 and the open position 24. The displacement leaf perforation 76 may include an angled perforation 76 between the base 62 and the leg 64. The angled perforation 76 may have a range between 30 to 60 degrees.

The displacement leaf perforation 74 is offset relative to the hinge fold 30 for defining a perforation offSet dimension 78 between the hinge fold 30 and the displacement leaf perforation 74. The perforation offset dimension 78 causes bending of the displacement leaf 60 at the displacement leaf perforation 74 before the displacement leaf 60 begins pivoted within the channel 110.

A frangible interior couple 120 secures the obverse side 82 of the interior leaf 80 with the reverse side 44 of the front cover 40. The frangible interior couple 120 may include a frangible glue 122. The frangible interior couple 120 is offset relative to the hinge fold 30 for defining a frangible offset dimension 124 between the hinge fold 30 and the base 62. The frangible interior couple 120 and the frangible offset dimension 124 cause bending of the displacement leaf at the displacement leaf perforation 74 before the displacement leaf 60 begins pivoted within the channel 110. The base offset dimension 72 and the frangible offset dimension 124 may define an equivalent offset dimension 130 for facilitating bending of the displacement leaf 60 at the displacement leaf perforation 74 before the displacement leaf 60 begins pivoted within the channel 110.

As described above, the second interior couple 100 may include an adhesive 102. The adhesive 102 is offset relative to the hinge fold 30 for defining an adhesive offset dimension 104 between the hinge fold 30 and the adhesive 102. The adhesive offset dimension 104 permits pivoting of the displacement leaf 60 and positions the tab 66 above the rear cover 50.

The interior leaf 80 may include a leaf notch 140 for facilitating the positioning of a portion of the leg 64 and the tab 66 between the interior leaf 80 and the rear cover 50. More specifically, the leaf notch 140 may include a primary notch edge 142 and a secondary notch edge 144. The primary notch edge 142 engages with the leg 64 and causes betiding of the displacement leaf 60 before the displacement leaf 60 begins pivoted within the channel 110. The secondary notch edge 144 permits the leg 64 to pivot within the channel 110 and extend the tab 66 above the rear cover 50.

The primary notch edge 142 is offset relative to the hinge fold 30 for defining a primary notch edge offset dimension 150 between the hinge fold 30 and the primary notch edge 142. The primary notch edge offset dimension 150 causes bending of the displacement leaf 60 before the displacement leaf 60 begins pivoted within the channel 110.

The leg 64 may include a curved edge 65 for avoiding contact with the second interior couple 100. The leg 64 may include a kg extension 67 coupled to the displacement leaf 60 for providing an increased surface area of the displacement leaf 60 with the interior leaf 80 and the rear cover 50 and promoting channeling the displacement leaf 60 in the channel 110 during pivoting the front cover 40. A tab perforation 68 may be located between the leg 64 and the tab 66 for facilitating the removal of the tab 66 from the leg 64.

The pivoting pop up article 10 may further include a second interior leaf 160 having an obverse side 162, a reverse side 164, an inner edge 166 and an outer edge 168. An interior hinge fold 170 is positioned between the reverse side 44 of the front cover 40 and the inner edge 166 of the second interior leaf 160. The second interior leaf 160 may be coupled to the front cover 40 by adhesive. The interior hinge fold is offset relative the hinge fold 30 for defining n interiort hinge offset dimension 172 between the hinge fold 30 and the interior hinge fold 170. The second interior leaf 160 may conceal a majority of the interior leaf 80.

The interior hinge fold 170 may include an interior leaf perforation 174 for Facilitating pivoting of the second interior leaf 160 relative to the front cover 40 at the interior leaf perforation 174 during pivoting the front cover 40 between the closed position 22 and the open position 24. The interior leaf perforation 174 further maintains the second interior leaf 160 adjacent to the rear cover 50 during pivoting the front cover 40 between the dosed position 22 and the open position 24. The interior leaf perforation 174 may further facilitate the removal of the second interior leaf 160 from the front cover 40.

The interior hinge offset dimension 172 causes the second interior leaf 160 to be displaced relative to the rear cover 50 during pivoting the front cover 40 between the closed position and the open position 24. More specifically, as the front cover 40 is positioned between the closed position 22 and the open position 24, the second interior leaf 160 is displaced relative to the rear cover 50 and exposes a greater area of the rear cover 50 adjacent of the outer edge 168 of the second interior leaf 160.

A symbol 180 may be imprinted on the tab 66. The symbol 180 may be printed on one side or both sides of the tab 66. Furthermore, the symbol 180 may include but not limited to advertisements 188, promotions 190, discount coupons 182, barcodes 184, literature, or other printed matter. The tab 66 may also include an object 180 such as an electronic key card, a credit card, voucher card, or other cards.

The base offset dimension 72, the perforation offset dimension 78 and the frangible offset dimension 124 may define an equivalent offset dimension 132 for facilitating bending of the displacement leaf 60 at the displacement leaf perforation 74 before the displacement leaf 60 begins pivoted within the channel 110. The base offset dimension 72, the perforation offset dimension 78 and the frangible offset dimension 124 may be defined by an offset area on the reverse side 11 of the front cover 40 that is immediately adjacent to the hinge fold 30. This offset area may include a width having a range between ¼ inch to 1 inch. After the bending or fracture of the displacement leaf perforation 74 and upon further displacement of the front cover 40 relative to the rear cover 50, the base offset dimension 72 causes the displacement leaf 62 pivot at the base 62 and displace a portion of the leg 64 at d the tab 66 within the channel 110 and finally to expose the tab 66 above the rear cover 50.

The pivoting pop-up article 10 provides a unique and surprise display for the operator of the pivoting pop-up article 10. More specifically, upon opening the pivoting pop-up article 10 with the front cover 40 from left to right produces the tab 66 being, exposed at a right angle direction to the front cover 40. The tab 66 surprisingly appears above the rear cover 50 in order to retain the attention of the operator. In addition, the tab 66 begins to be exposed above the rear cover 50 before the front cover 40 is fully positioned in the open position 24 resulting in incentivizing the operator to continue to open the pivoting pop-up article 10.

FIGS. 9-17 illustrate a method for manufacturing a pivoting pop up article from a continuous ribbon 210 of material using a line printing press 200, The method comprising the steps of inputting the continuous ribbon 210 into the line printing press 200. Images 186 are imprinted on the continuous ribbon 210. The images 182 may include but not limited to advertisements 188, promotions 190, symbols 180, discount coupons 182, barcodes 184. Literature, or other printed matter. Preferably, the pivoting pop-up article 10 is manufactured for the distribution through the US Postal Service or other private delivery service.

Figure 10:
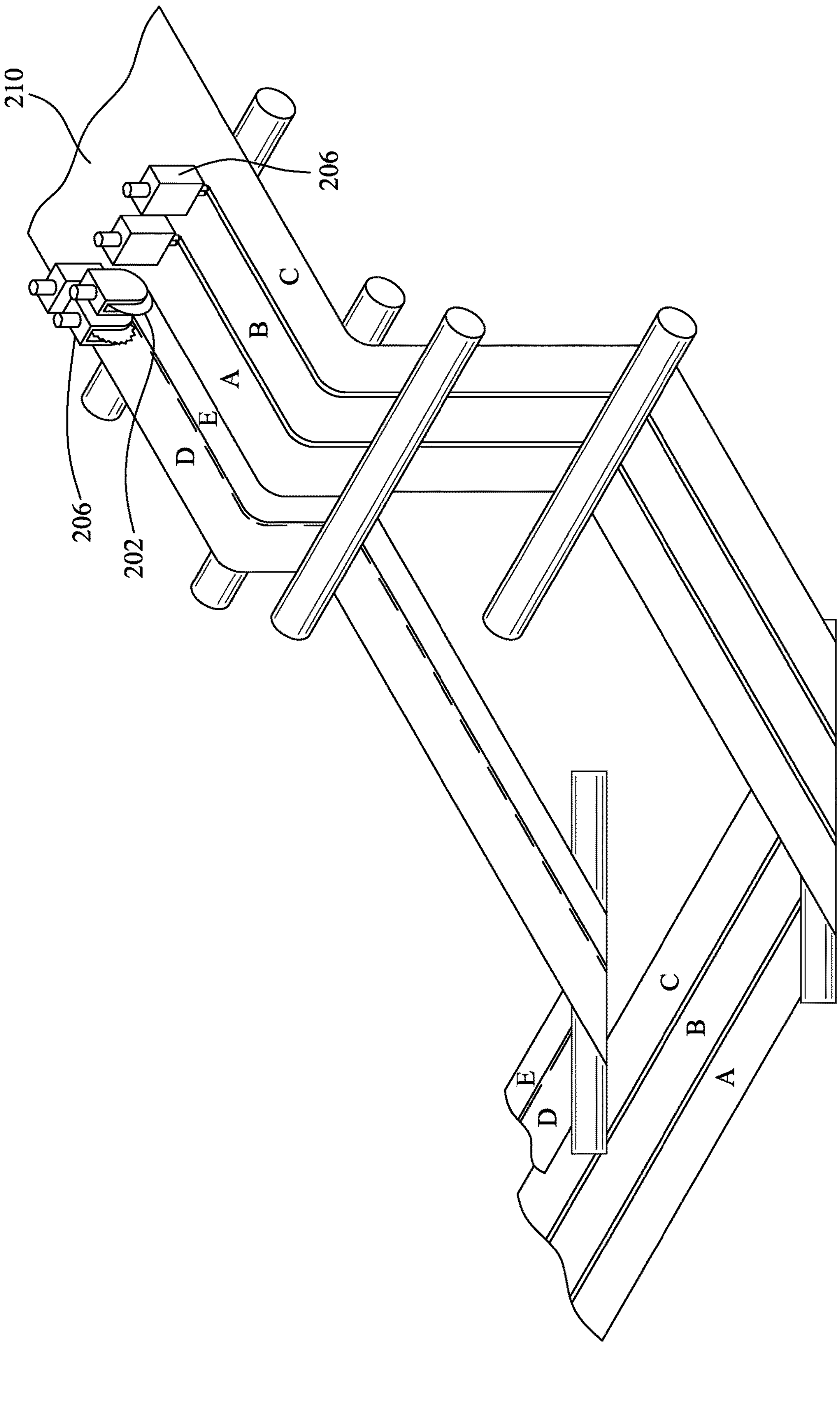
FIG. 10 is an isometric view of a portion of the line printing press of FIG. 9 illustrating a first step for manufacturing a pivoting pop up article including a separation split cut into the continuous ribbon to define a first ribbon having a front cover (A), a rear cover (B) and an interior leaf (C) and a second ribbon having a second interior leaf (D) and a displacement leaf (F) and perforating a first perforation into the second ribbon on the second interior leaf (D)
Figure 11:
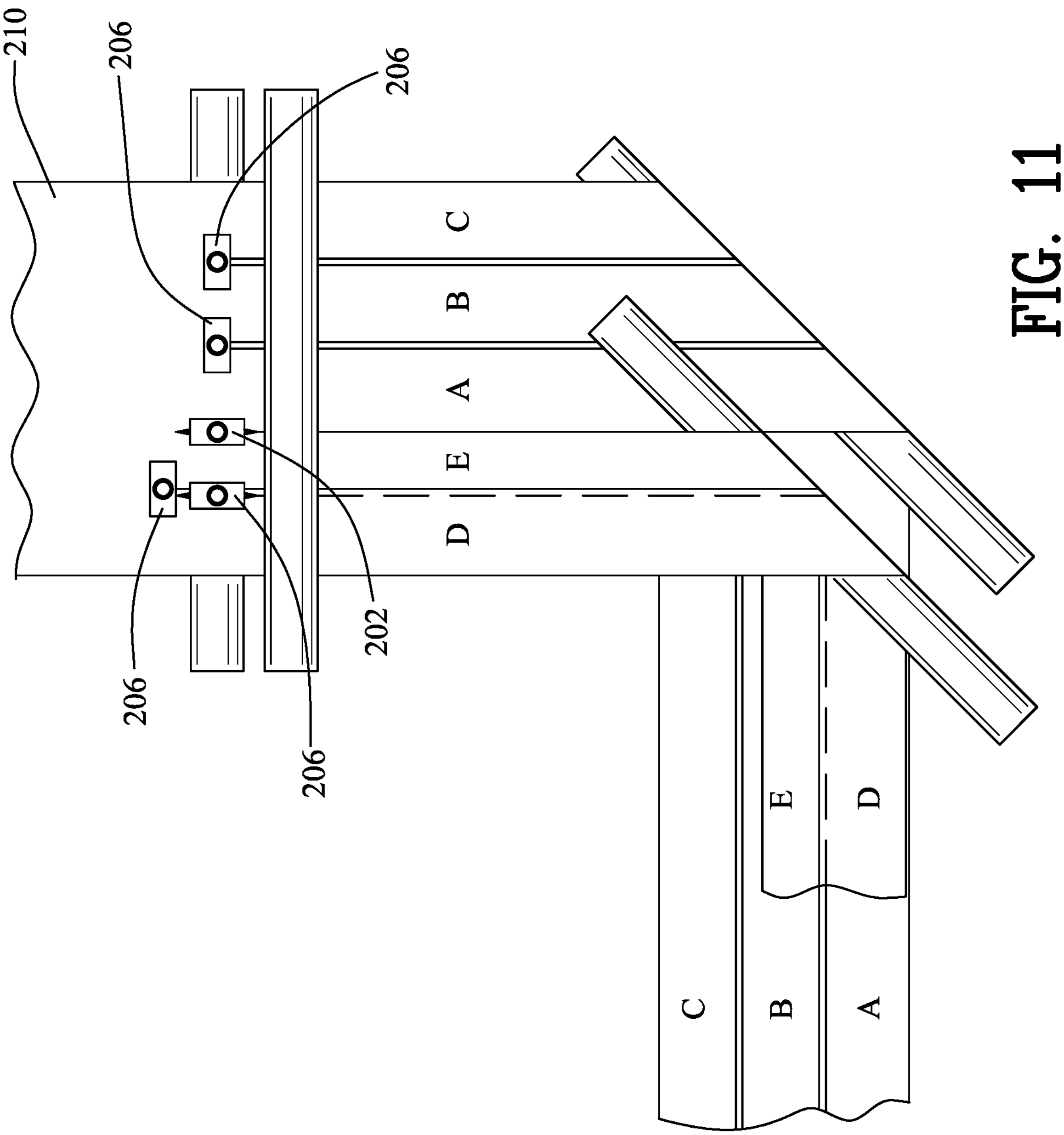
FIG. 11 is a top view of FIG. 10 illustrating the second ribbon realigned relative to the first ribbon.

FIG. 10 illustrates a portion of the line priming press 200 wherein a cutter 202 performs a separation split cut into the continuous ribbon 210 to define a first ribbon having a front cover (A) 40, a rear cover (B) 50 and an interior leaf (C) 80 and a second ribbon having a second interior leaf (D) 160 and a displacement leaf (E) 60 and perforating a first perforation 174 into the second ribbon on the second interior leaf (D) 160. FIG. 11 illustrates the second ribbon being realigned relative to the first ribbon.

Figure 12:
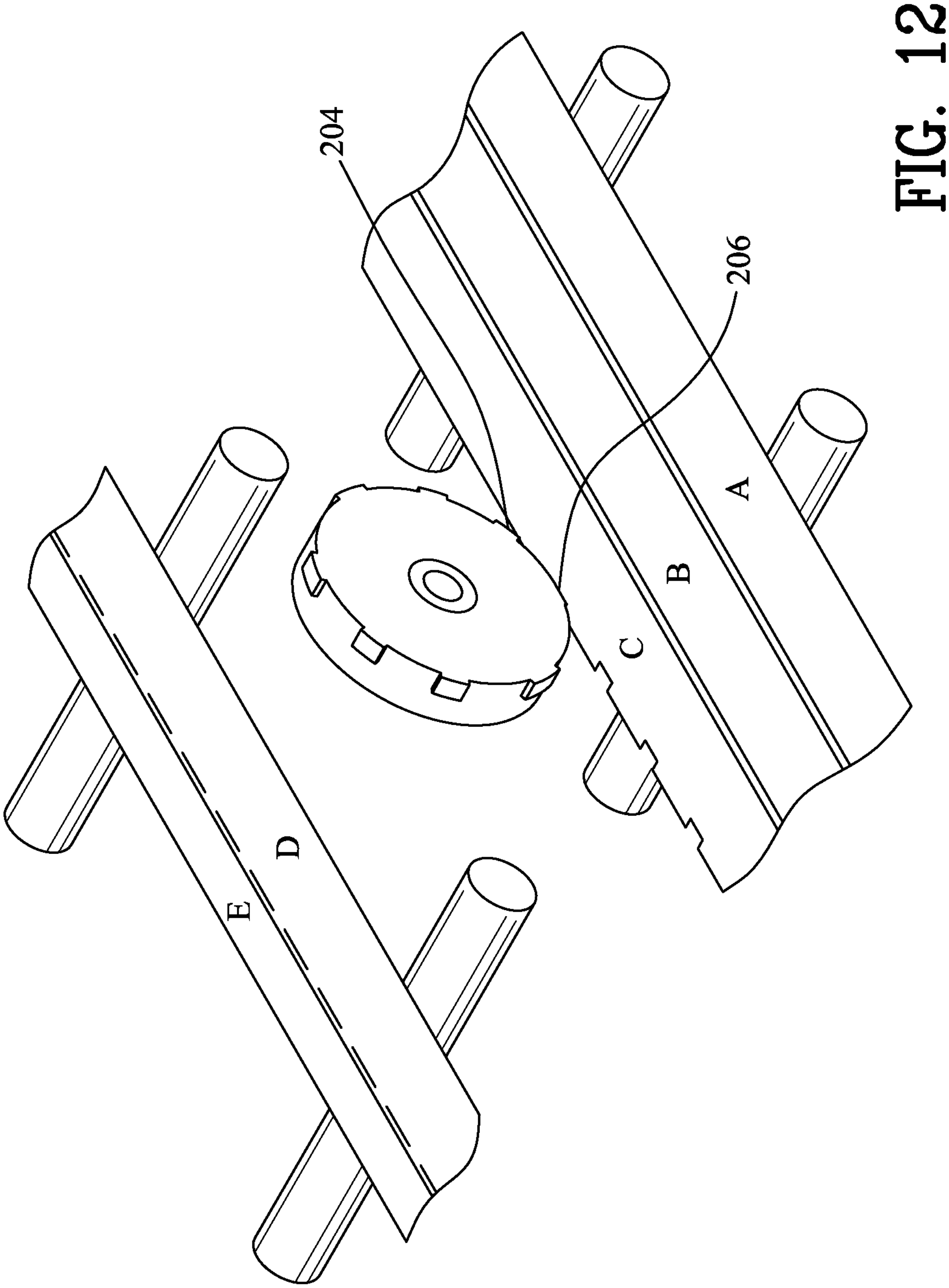
FIG. 12 is a portion of the line printing press of FIG. 9 illustrating a second step for manufacturing a pivoting pop up article including cutting a leaf notch in the interior leaf (C)
Figure 13:
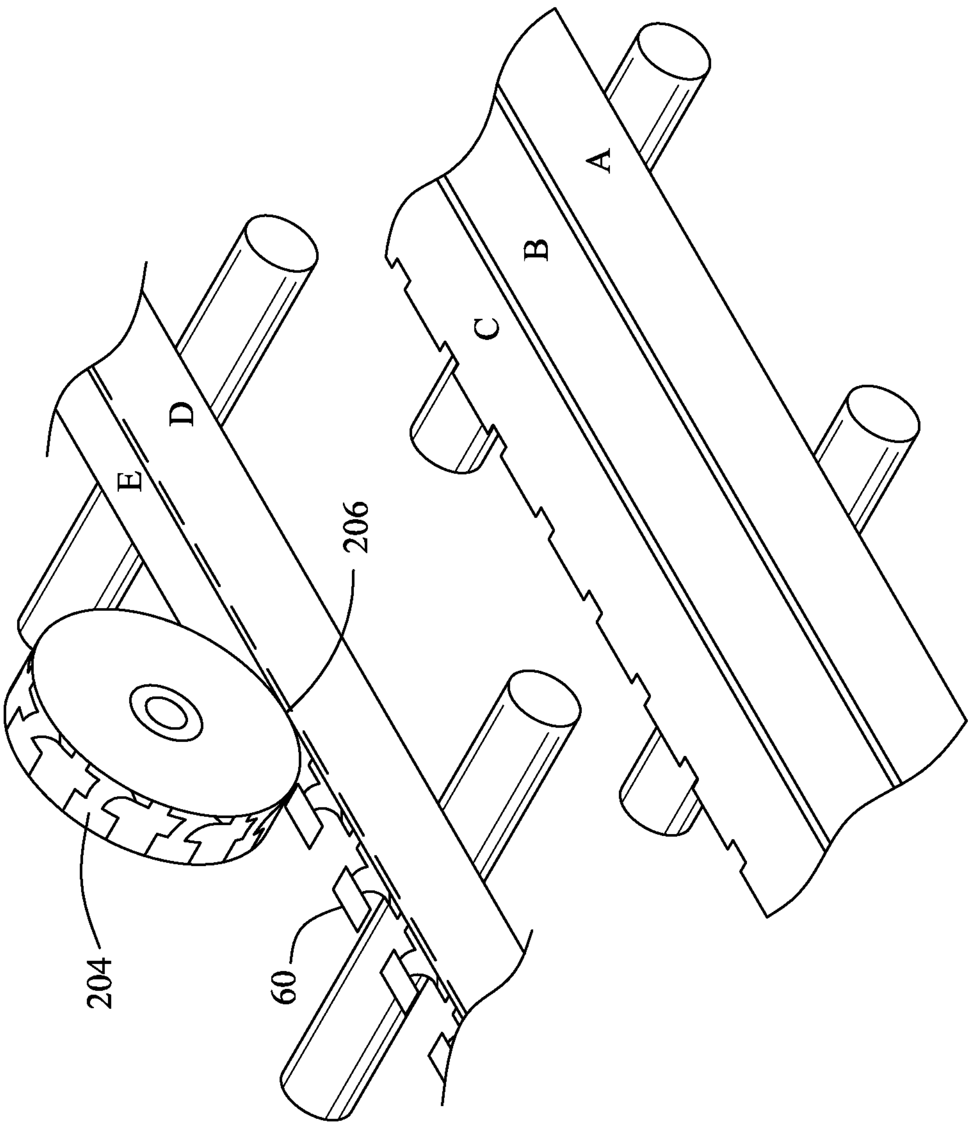
FIG. 13 is a portion of the line printing press of FIG. 9 illustrating a third step for manufacturing a pivoting pop up article including cutting a base, a leg and a tab from the displacement leaf (E) and perforating a second perforation between the base and the leg in the displacement leaf (E)

FIG. 12 illustrates a portion of the line printing press 200 wherein a dye cut 204 cuts a leaf notch 140 in the interior leaf (C) 80. FIG. 13 illustrates a portion of the line printing press 200 wherein a second dye cut 204 cuts a base, a leg and a tab from the displacement leaf (E) 60 and a perforation 206 that perforates a second perforation 74 between the base 62 and the leg 64 in the displacement leaf (E) 60.

Figure 14:
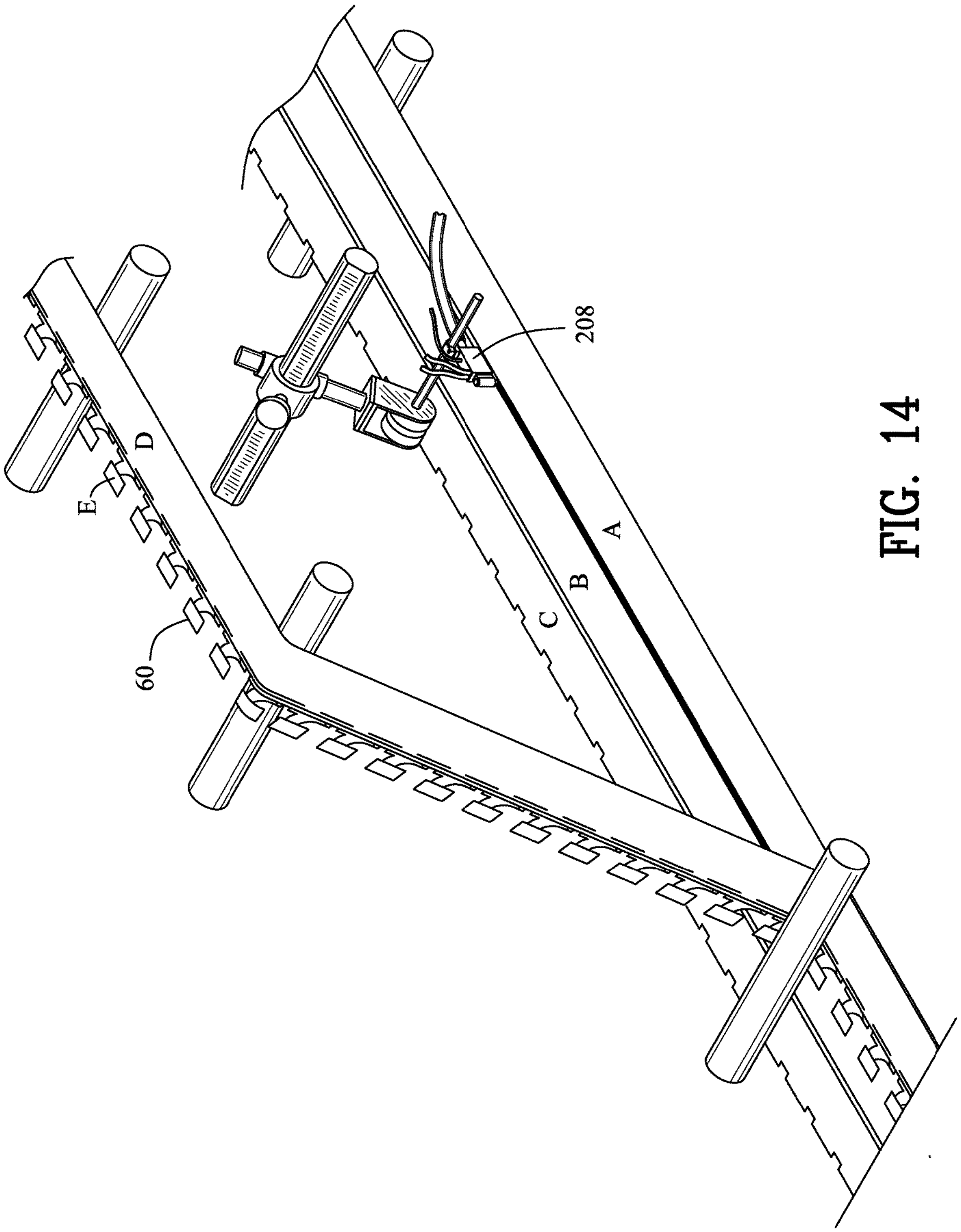
FIG. 14 is a portion of the line printing press of FIG. 9 illustrating a fourth step for manufacturing a pivoting pop up article including applying an adhesive for coupling a portion of the second interior leaf (D) to the front cover (A)
Figure 15:
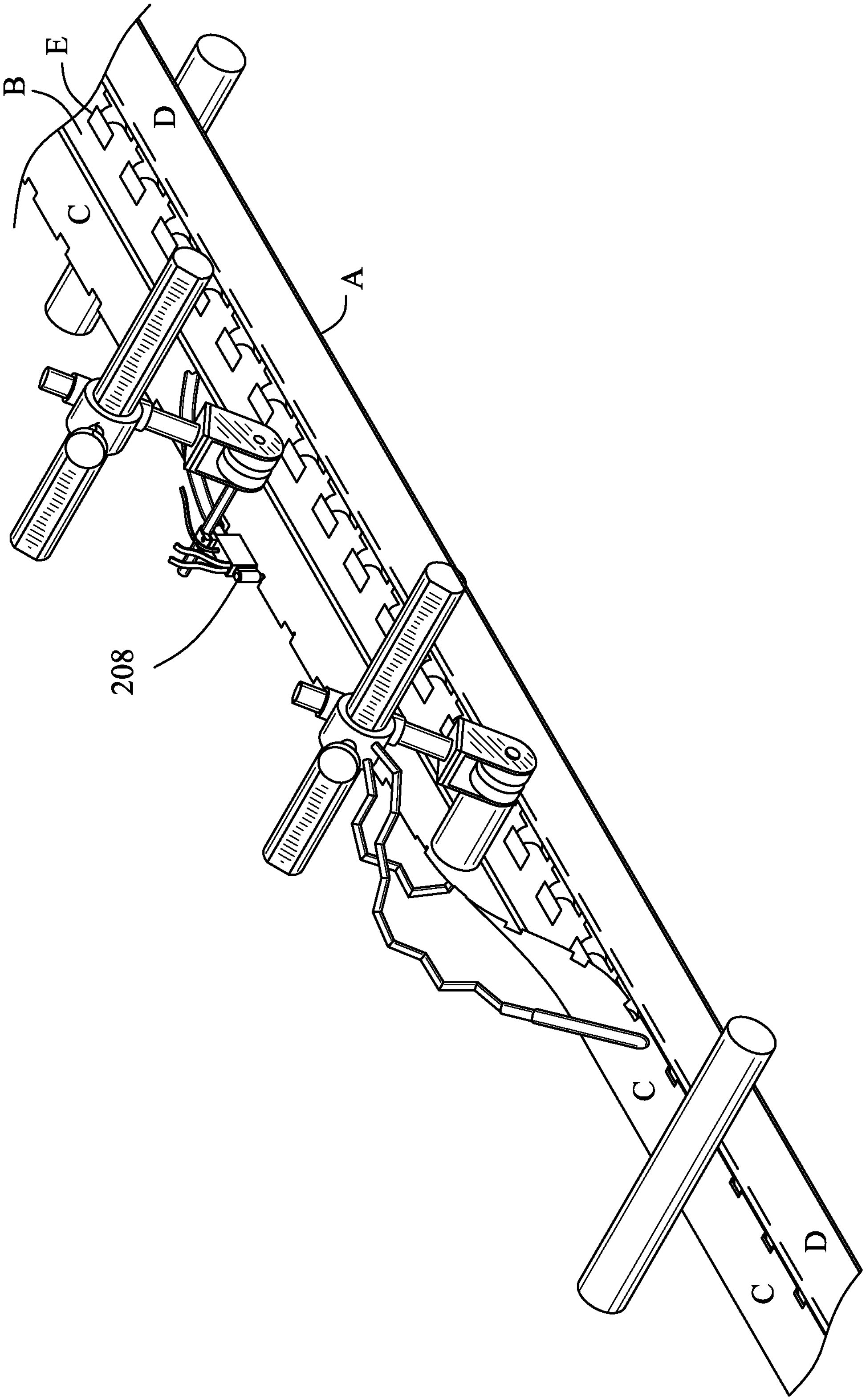
FIG. 15 is a portion of the line printing press of FIG. 9 illustrating a fifth step for manufacturing a pivoting pop up article including applying an adhesive for coupling a portion of the interior leaf (C) to the rear cover (B) and folding the interior leaf (C) onto the rear cover (B) for positioning a portion of the leg and the tab between the rear cover (B) and the interior leaf (C)

FIG. 14 illustrates a portion of the line printing press 200 wherein a first glue dispenser 208 applies an adhesive for coupling a portion of the second interior leaf (D) 160 to the front cover (A) 40 FIG. 15 illustrates a portion of the line printing press 200 wherein a second glue dispenser 208 applies an adhesive for coupling a portion of the interior leaf (C) 80 to the rear cover (B) 50 and folding the interior leaf (C) 80 onto the rear corer (B) 50 for positioning a portion of the leg 64 and the tab 66 between the rear cover (B) 50 and the interior leaf (C) 80.

Figure 16:
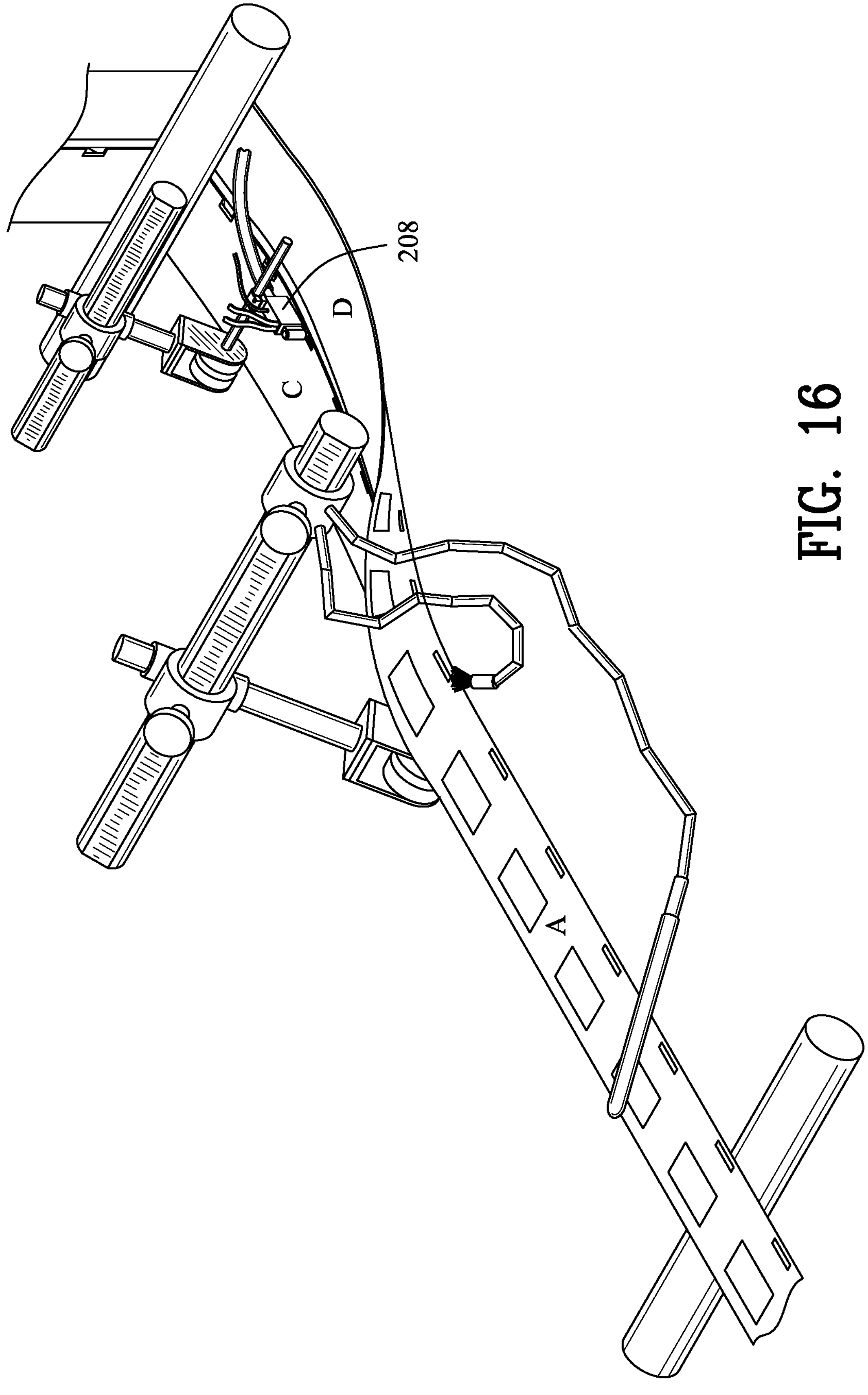
FIG. 16 is a portion of the line printing press of FIG. 9 illustrating a sixth step for manufacturing a pivoting pop up article including applying a frangible adhesive for coupling a portion of the interior leaf (C) to the second interior leaf (I)), applying an adhesive for coupling the base of the displacement leaf to the second interior leaf (ID) and folding the rear cover (B) onto the front cover (A)
Figure 17:
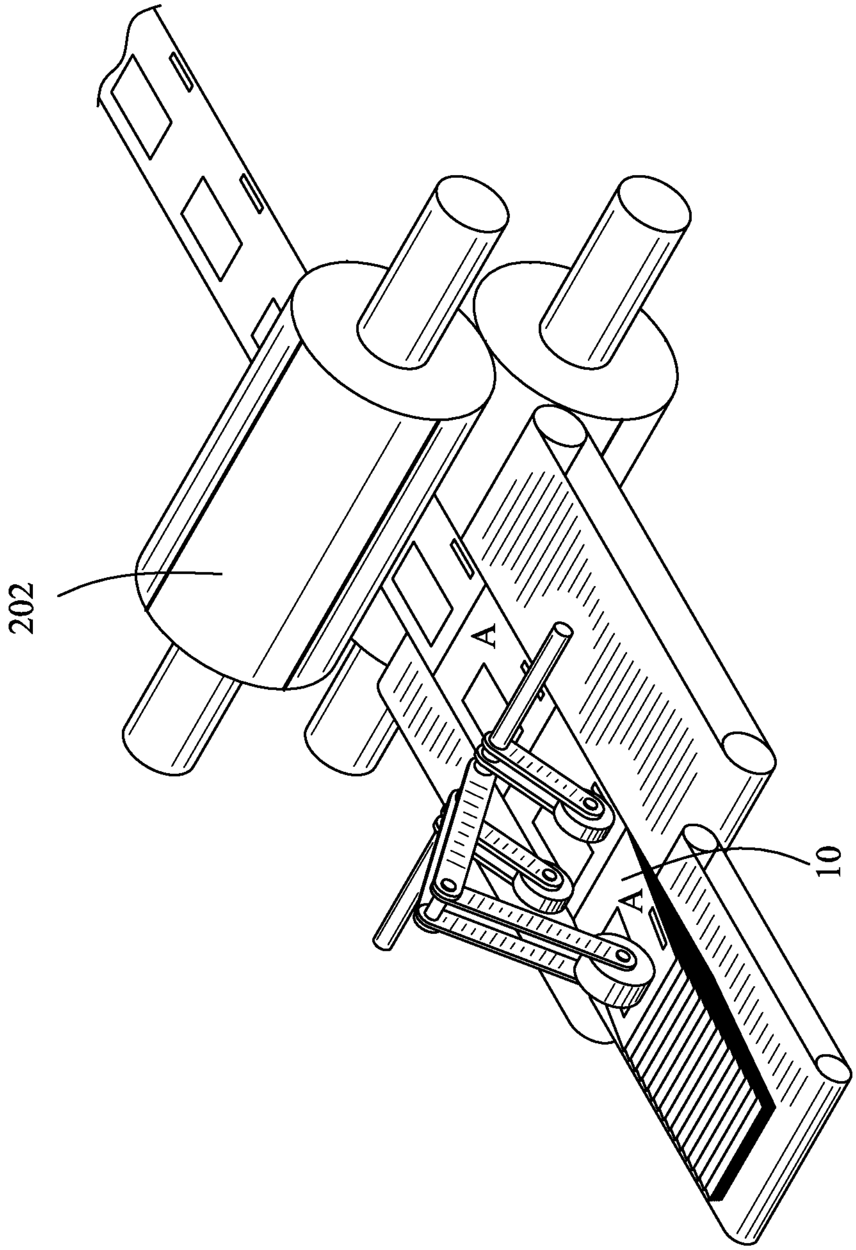
FIG. 17 is a portion of the line priming press of FIG. 9 illustrating a seventh step for manufacturing a pivoting pop up article including cutting the rear cover (B) and the front cover (A) for creating multiple pivoting pop up articles.

FIG. 16 illustrates a portion of the line printing press 200 wherein a third glue dispenser 208 applies a frangible adhesive 122 for coupling a portion of the interior leaf (C) 80 to the second interior leaf (D) 160, applies an adhesive for coupling the base 62 of the displacement leaf 60 to the second interior leaf (D) 160 and folds the rear cover (B) 50 onto the front cover (A) 40, FIG. 17 illustrates a portion of the line printing press 200 wherein a cutter 202 cuts the rear cover (B) 50 and the front cover (A) 40 for creating multiple pivoting pop up articles 10.

In order to maintain the pivoting pop-up article 10 in the closed position 22 a closure adhesive 212 may be applied for coupling the rear cover (B) with the front cover (A). The closure adhesive 212 further facilitates the distribution of the pivoting pop-up article 10 through the US Postal Service or other private delivery service.

While the foregoing is directed to embodiments of the present disclosure, other and further embodiments of the disclosure may be devised without departing from the basic scope thereof, and the scope thereof is determined by the claims that follow,

What is claimed is:

1. A pivoting pop up article, comprising:

an exterior cover having a hinge fold positioned between a front cover and a rear cover for pivoting said front cover between a closed position and an open position;

said front cover having an obverse side and a reverse side;

said rear cover having an obverse side and a reverse side;

a displacement leaf including a base, a leg and a tab;

a base leaf couple securing said base of said displacement leaf to said reverse side of said front cover;

said base being offset relative to said hinge fold for defining a base offset dimension between said hinge fold and said base, an interior leaf having an obverse side, a reverse side, an inner edge and an outer edge;

a first interior couple securing said reverse side of said interior leaf to said obverse side of said rear cover;

a second interior couple securing said reverse side of said interior leaf to said obverse side of said rear cover;

said first interior couple and said second interior couple defining a channel between said rear cover and said interior leaf; and said base offset dimension causing said displacement leaf to be pivoted within said channel during pivoting said front cover between said closed position and said open position for extending, said tab above said rear cover.

2. The pivoting pop up article as set forth in claim 1, further including a displacement leaf perforation between said base and said leg for facilitating said displacement leaf to be pivoted within said channel during pivoting said front cover between said closed position and said open position.

3. The pivoting pop up article as set froth in claim 2, wherein said displacement leaf perforation includes an angled perforation between said base and said leg.

4. The pivoting pop up article as set forth in claim 2, wherein said displacement leaf perforation being offset relative to said hinge fold for defining a perforation offset dimension between said hinge fold and said displacement leaf perforation; and said perforation offset dimension causing bending of said displacement leaf at said displacement leaf perforation before said displacement leaf begins pivoted within said channel.

5. The pivoting pop up article as set forth in claim 2, further including a frangible interior couple securing said obverse side of said interior leaf with said reverse side of said front cover;

said frangible interior couple being offset relative to said hinge fold for defining a frangible offset dimension between said hinge fold and said base, and said frangible interior couple and said frangible offset dimension causing bending of said displacement leaf at said displacement leaf perforation before said displacement leaf begins pivoted within said channel.

6. The pivoting pop up article as set forth in claim 5, wherein said base offset dimension and said frangible offset dimension defining an equivalent offset dimension for facilitating bending of said displacement leaf at said displacement leaf perforation before said displacement leaf begins pivoted within said channel.

7. The pivoting pop up article as set forth in claim 1, wherein said interior leaf includes an interior cover; and said first interior couple includes a second hinge fold positioned between said rear cover and said interior cover.

8. The pivoting pop up article as set forth in claim 1, wherein said second interior couple includes an adhesive;

said adhesive being offset relative to said hinge fold for defining an adhesive offset dimension between said hinge fold and said adhesive; and said adhesive offset dimension permitting pivoting of said displacement leaf and positioning said tab above said rear cover.

9. The pivoting pop up article as set forth in claim 1, wherein said interior leaf includes a leaf notch for positioning a portion of said leg and said tab between said interior leaf and said rear cover.

10. The pivoting pop up article as set forth in claim 9, wherein said leaf notch includes a primary notch edge and a secondary notch edge;

said primary notch edge engaging with said leg and causing bending of said displacement leaf before said displacement leaf begins pivoted within said Channel; and said secondary notch edge permitting said leg to pivot within said channel and extend said tab above said rear cover.

11. The pivoting pop up article as set forth in claim 10, wherein said primary notch edge being offset relative to said hinge fold for defining a primary notch edge offset dimension between said hinge fold and said primary notch edge; and said primary notch edge offset dimension causing bending of said displacement leaf before said displacement leaf begins pivoted within said channel.

12. The pivoting pop up article as set forth in claim 1, wherein said leg, includes a curved edge for avoiding contact with said second interior couple.

13. The pivoting pop up article as set forth in claim 1, wherein said leg includes a leg extension coupled to said displacement leaf for providing an increased surface area of said displacement leaf with said interior leaf and said rear cover and promoting channeling said displacement leaf in said channel during pivoting said front cover.

14. The pivoting pop up article as set forth in claim 1, further including, a tab perforation between said leg and said tab for facilitating the removal of said tab from said leg.

15. The pivoting pop up article as set forth in claim 1, further including a second interior leaf having an obverse side, a reverse side, an inner edge and an outer edge;

an interior hinge fold positioned between said reverse side of said front cover and said inner eke of said second interior leaf;

said interior hinge fold being offset relative to said hinge fold for defining an interior hinge offset dimension between said hinge fold and said interior hinge fold; and said second interior leaf concealing said interior leaf.

16. The pivoting pop up article as set forth in claim 15, wherein said interior hinge fold includes an interior leaf perforation for facilitating pivoting of said second interior leaf relative to said front cover at said interior leaf perforation during pivoting said front over between said dosed position and said open position and maintaining said second interior leaf adjacent to said rear cover during pivoting, said front cover between said closed position and said open position.

17. The pivoting pop up article as set forth in claim 15, wherein said interior hinge fold includes an interior leaf perforation for facilitating the removal of said second interior leaf from said front cover.

18. The pivoting pop up article as set forth in claim 15, wherein said interior hinge offset dimension causing said second interior leaf to be displaced relative to said rear cover during pivoting said front cover between said closed position and said open position.

19. The pivoting pop up article as set forth in claim 1, further including a symbol imprinted on said tab.

20. A pivoting pop up article, comprising:

an exterior cover having a hinge fold positioned between a front cover and a rear cover for pivoting said front cover between a dosed position and an open position;

said front cover having an obverse side and a reverse side;

said rear cover having an obverse side and a reverse side;

a displacement leaf including a base, a leg and a tab;

a base leaf couple securing said base of said displacement leaf to said reverse side of said front cover;

said base being offset relative to said hinge fold for defining a base offset dimension between said hinge fold and said base, an interior leaf having an obverse side, a reverse side, an inner edge and an outer edge;

a first interior couple securing said reverse side of said interior leaf to said obverse side of said rear cover, a second interior couple securing said reverse side of said interior leaf to said obverse side of said rear cover;

said first interior couple and said second interior couple defining a channel between said rear cover and said interior leaf;

said base offset dimension causing said displacement leaf to be pivoted within said channel during pivoting said front cover between said closed position and said open position for extending said tab above said rear cover;

a displacement leaf perforation between said base and said leg for facilitating said interior leaf to be pivoted within said channel during pivoting said front cover between said closed position and said open position;

said displacement leaf perforation being offset relative to said hinge fold for defining a perforation offset dimension between said hinge fold and said displacement leaf perforation;

a frangible interior couple securing said obverse side of said interior leaf with said reverse side of said front cover;

said frangible interior couple being offset relative to said hinge fold for defining a frangible offset dimension between said hinge fold and said base; and said base offset dimension, said perforation offset dimension and said frangible offset dimension defining an equivalent offset dimension for facilitating bending of said displacement leaf at said displacement leaf perforation before said displacement leaf begins pivoted within said channel.

21. The pivoting pop up article as set forth in claim 20, wherein said interior leaf includes a leaf notch for positioning a portion of said leg and said tab between said interior leaf and said rear cover;

said leaf notch for includes a primary notch edge and a secondary notch edge;

said primary notch edge engaging with said leg and causing bending of said displacement leaf before said displacement leaf begins pivoted within said channel;

said primary notch edge being offset relative to said hinge fold for defining a primary notch edge offset dimension between said hinge fold and said primary notch edge; and said primary notch edge offset dimension further causing bending of said displacement leaf before said displacement leaf begins pivoted within said channel.

22. A method for manufacturing a pivoting; pop up article from a continuous ribbon of material using a line printing press, the method comprising the steps of:

inputting the continuous ribbon into the line printing press;

imprinting images on the continuous ribbon;

cutting a separation split into the continuous ribbon to define a first ribbon having a front cover (A), a rear cover (B) and an interior leaf (C) and a second ribbon having a second interior leaf (D) and a displacement leaf (E), perforating a first perforation into the second ribbon on the second interior leaf (D);

cutting a leaf notch in the interior leaf (C);

cutting a base, a leg and a tab from the displacement leaf (E);

perforating a second perforation between the base and the leg in the displacement leaf (E);

applying an adhesive for coupling a portion of the second interior leaf (D) to the front cover (A);

applying an adhesive for coupling a portion of the interior leaf (C) to the rear cover (B);

folding the interior leaf (C) onto the rear cover (B) for positioning a portion of the leg and the tab between the rear cover (B) and the interior leaf (C);

applying a frangible adhesive for coupling a portion of the interior leaf (C) to the second interior leaf (D);

applying an adhesive for coupling the base of the displacement leaf to the second interior leaf (I));

folding the rear cover (B) onto the front cover (A); and cutting the rear cover (B) and the front cover (A) for creating multiple pivoting pop up articles.

23. The method for manufacturing a pivoting pop up article as set forth in claim 22, further including the steps of applying an adhesive for coupling the rear cover (B) with the front cover (A).

* * * * *